(12) United States Patent
Go et al.

(10) Patent No.: US 11,833,585 B2
(45) Date of Patent: Dec. 5, 2023

(54) TECHNIQUES FOR DEPOWDERING ADDITIVELY FABRICATED PARTS THROUGH VIBRATORY MOTION AND RELATED SYSTEMS AND METHODS

(71) Applicant: Desktop Metal, Inc., Burlington, MA (US)

(72) Inventors: Jamison Go, Orlando, FL (US); Robert Michael Shydo, Jr., Pelham, NH (US); Emanuel M. Sachs, Newton, MA (US); Michael Santorella, Boston, MA (US); Midnight Zero, Wilmington, MA (US); Jonah Samuel Myerberg, Lexington, MA (US); Joseph Gabay, Somerville, MA (US); Jeffrey von Loesecke, Hingham, MA (US); Alexander K. McCalmont, Hollis, NH (US)

(73) Assignee: Desktop Metal, Inc., Burlington, MA (US)

(*) Notice: Subject to any disclaimer, the term of this patent is extended or adjusted under 35 U.S.C. 154(b) by 151 days.

(21) Appl. No.: 16/989,149

(22) Filed: Aug. 10, 2020

(65) Prior Publication Data

US 2021/0053121 A1    Feb. 25, 2021

Related U.S. Application Data

(60) Provisional application No. 62/885,692, filed on Aug. 12, 2019.

(51) Int. Cl.
*B22F 10/14* (2021.01)
*B22F 10/00* (2021.01)
(Continued)

(52) U.S. Cl.
CPC ............. *B22F 10/14* (2021.01); *B22F 1/10* (2022.01); *B22F 10/00* (2021.01); *B33Y 10/00* (2014.12); *B33Y 30/00* (2014.12)

(58) Field of Classification Search
CPC ........ B22F 10/00; B22F 1/10; B22F 2999/00; B22F 10/28; B22F 10/68; B22F 12/82;
(Continued)

(56) References Cited

U.S. PATENT DOCUMENTS

| | | | |
|---|---|---|---|
| 5,658,412 | A | 8/1997 | Retallick et al. |
| 6,932,935 | B1 | 8/2005 | Oberhofer et al. |

(Continued)

FOREIGN PATENT DOCUMENTS

| | | |
|---|---|---|
| EP | 3 434 448 A1 | 1/2019 |
| KR | 20160028907 A | 3/2016 |

OTHER PUBLICATIONS

U.S. Appl. No. 16/269,713, filed Feb. 7, 2019, Jordan.
(Continued)

*Primary Examiner* — Anthony M Liang
*Assistant Examiner* — Danny N Kang
(74) *Attorney, Agent, or Firm* — Wolf, Greenfield & Sacks, P.C.

(57) ABSTRACT

Techniques for depowdering in additive fabrication are provided. According to some aspects, techniques are provided that separate powder from parts through vibration of the powder, the parts, and/or structures mechanically connected to the powder and/or parts. For instance, the application of vibration may dislodge, aerate and/or otherwise increase the flowability of regions of the powder, thereby making it easier to remove the powder with a suitable means. Techniques for depowdering through vibration may be automated, thereby mitigating challenges associated with manual depowdering operations.

16 Claims, 20 Drawing Sheets

(51) Int. Cl.
  *B22F 1/10* (2022.01)
  *B33Y 10/00* (2015.01)
  *B33Y 30/00* (2015.01)

(58) Field of Classification Search
  CPC ......... B22F 10/14; B33Y 10/00; B33Y 30/00; B33Y 40/20; Y02P 10/25
  See application file for complete search history.

(56) References Cited

U.S. PATENT DOCUMENTS

| | | | |
|---|---|---|---|
| 8,545,209 | B2 | 10/2013 | Shi et al. |
| 9,887,356 | B2 | 2/2018 | McAlpine et al. |
| 10,377,061 | B2 | 8/2019 | Wolfgang et al. |
| 10,406,751 | B2 | 9/2019 | Fulop et al. |
| 10,500,789 | B2 | 12/2019 | Fulop et al. |
| 11,207,733 | B2 | 12/2021 | Pourcher et al. |
| 11,491,720 | B2 | 11/2022 | Jordan |
| 2001/0045678 | A1 | 11/2001 | Kubo et al. |
| 2002/0090410 | A1 | 7/2002 | Tochimoto et al. |
| 2004/0003738 | A1 | 1/2004 | Imiolek et al. |
| 2004/0084814 | A1 | 5/2004 | Boyd et al. |
| 2005/0001356 | A1 | 1/2005 | Tochimoto et al. |
| 2008/0060330 | A1 | 3/2008 | Davidson et al. |
| 2009/0211616 | A1 | 8/2009 | Tafoya |
| 2009/0255912 | A1 | 10/2009 | Dietrich |
| 2009/0283119 | A1 | 11/2009 | Moussa et al. |
| 2011/0186081 | A1 | 8/2011 | Dunn et al. |
| 2011/0300248 | A1 | 12/2011 | Tung et al. |
| 2013/0026680 | A1 | 1/2013 | Ederer et al. |
| 2013/0052291 | A1 | 2/2013 | Morikawa |
| 2013/0075957 | A1 | 3/2013 | Swanson et al. |
| 2013/0241095 | A1 | 9/2013 | Korten et al. |
| 2013/0244040 | A1 | 9/2013 | Oshima |
| 2014/0141961 | A1 | 5/2014 | Koszo et al. |
| 2015/0258744 | A1 | 9/2015 | Muller et al. |
| 2015/0314389 | A1 | 11/2015 | Yamada |
| 2016/0200053 | A1 | 7/2016 | Chen et al. |
| 2016/0263827 | A1 | 9/2016 | Fripp et al. |
| 2016/0318253 | A1 | 11/2016 | Barnhart |
| 2016/0325507 | A1 | 11/2016 | Chu et al. |
| 2016/0368224 | A1 | 12/2016 | Ooba et al. |
| 2017/0071707 | A1 | 3/2017 | Uckelmann et al. |
| 2017/0144874 | A1 | 5/2017 | Huebinger et al. |
| 2017/0239893 | A1 | 8/2017 | Hoover et al. |
| 2017/0297097 | A1 | 10/2017 | Gibson et al. |
| 2017/0348910 | A1 | 12/2017 | Hutchinson |
| 2018/0133968 | A1 | 5/2018 | Zeulner |
| 2018/0193887 | A1 | 7/2018 | Pourcher et al. |
| 2018/0297114 | A1 | 10/2018 | Preston et al. |
| 2018/0297284 | A1 | 10/2018 | Fulop et al. |
| 2018/0305266 | A1 | 10/2018 | Gibson et al. |
| 2018/0307209 | A1 | 10/2018 | Chin et al. |
| 2018/0370213 | A1 | 12/2018 | Gold et al. |
| 2019/0022942 | A1 | 1/2019 | Fulop et al. |
| 2019/0030810 | A1* | 1/2019 | Gasso .................. B29C 64/357 |
| 2019/0039367 | A1 | 2/2019 | Roman et al. |
| 2019/0076924 | A1 | 3/2019 | Jepeal et al. |
| 2019/0084229 | A1 | 3/2019 | Gunther |
| 2019/0143597 | A1 | 5/2019 | Huang et al. |
| 2019/0160537 | A1 | 5/2019 | Hofmann |
| 2019/0240913 | A1 | 8/2019 | Jordan |
| 2021/0008808 | A1 | 1/2021 | Cudzilo et al. |
| 2021/0046519 | A1 | 2/2021 | Go et al. |
| 2021/0237159 | A1 | 8/2021 | Go et al. |

OTHER PUBLICATIONS

U.S. Appl. No. 16/983,138, filed Aug. 3, 2020, Go et al.
U.S. Appl. No. 17/117,200, filed Dec. 10, 2020, Go et al.
PCT/US2018/027611, Aug. 29, 2018, International Search Report and Written Opinion.
PCT/US2018/027611, Oct. 24, 2019, International Preliminary Report on Patentability.
PCT/US2019/016967, May 6, 2019, International Search Report and Written Opinion.
PCT/US2019/016967, Aug. 20, 2020, International Preliminary Report on Patentability.
International Search Report and Written Opinion dated Aug. 29, 2018 in connection with International Application No. for PCT/US2018/027611.
International Preliminary Report on Patentability dated Oct. 24, 2019 in connection with International Application No. PCT/US2018/027611.
International Search Report and Written Opinion dated May 6, 2019 in connection with International Application No. PCT/US2019/016967.
International Preliminary Report on Patentability dated Aug. 20, 2020 in connection with International Application No. PCT/US2019/016967.
U.S. Appl. No. 17/976,335, filed Oct. 28, 2022, Jordan.

* cited by examiner

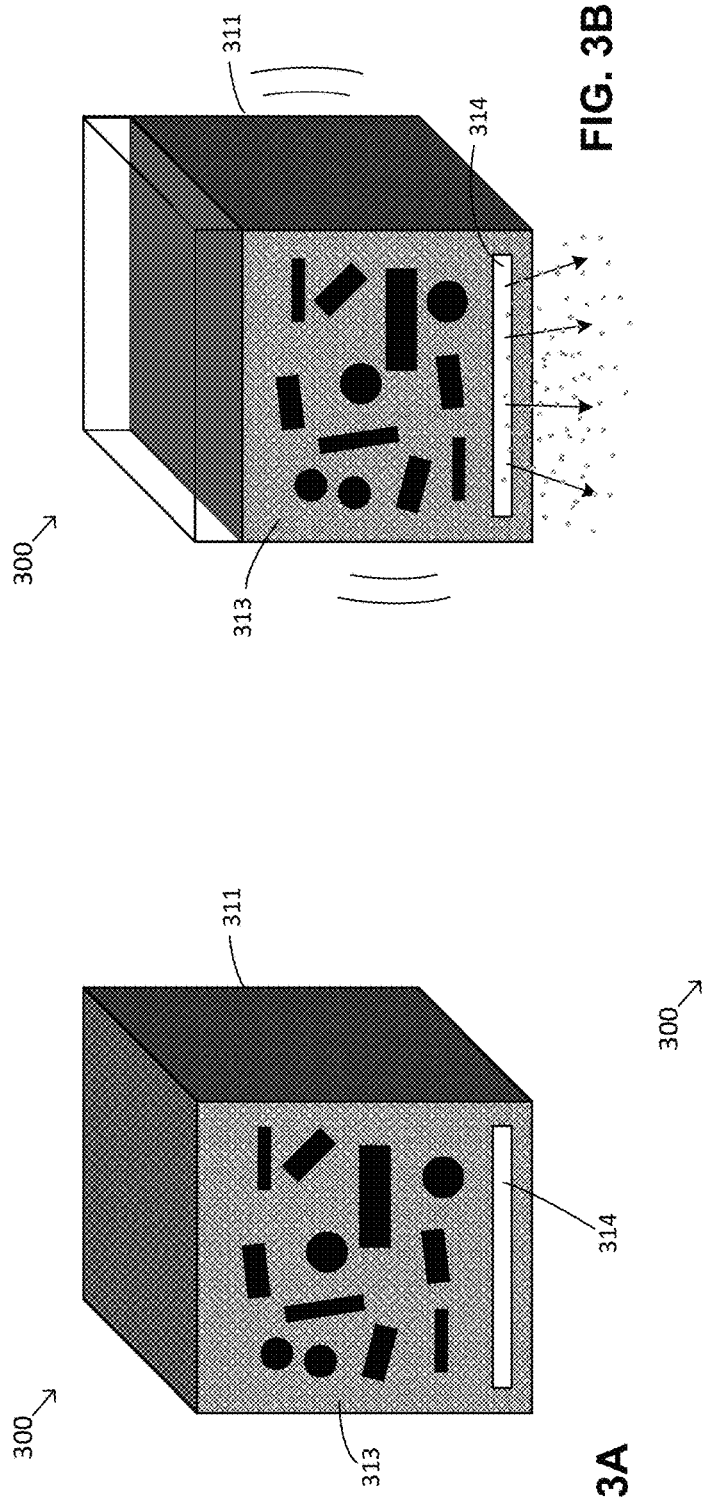

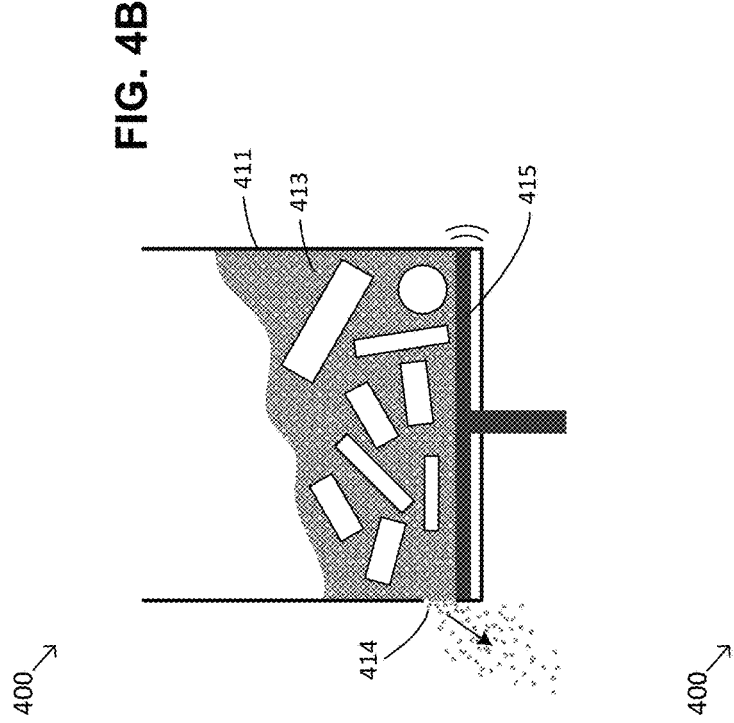
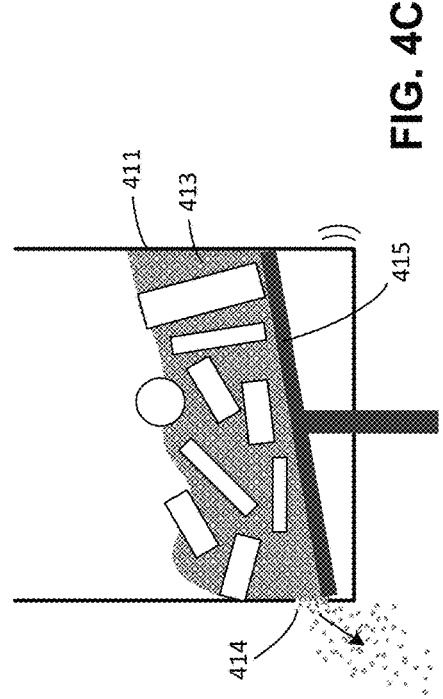
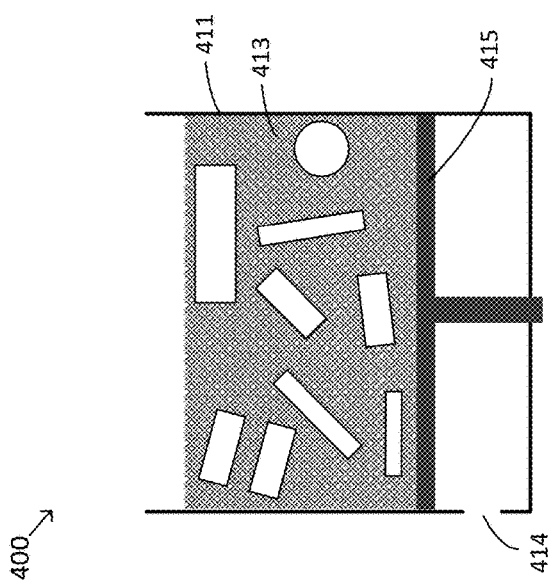

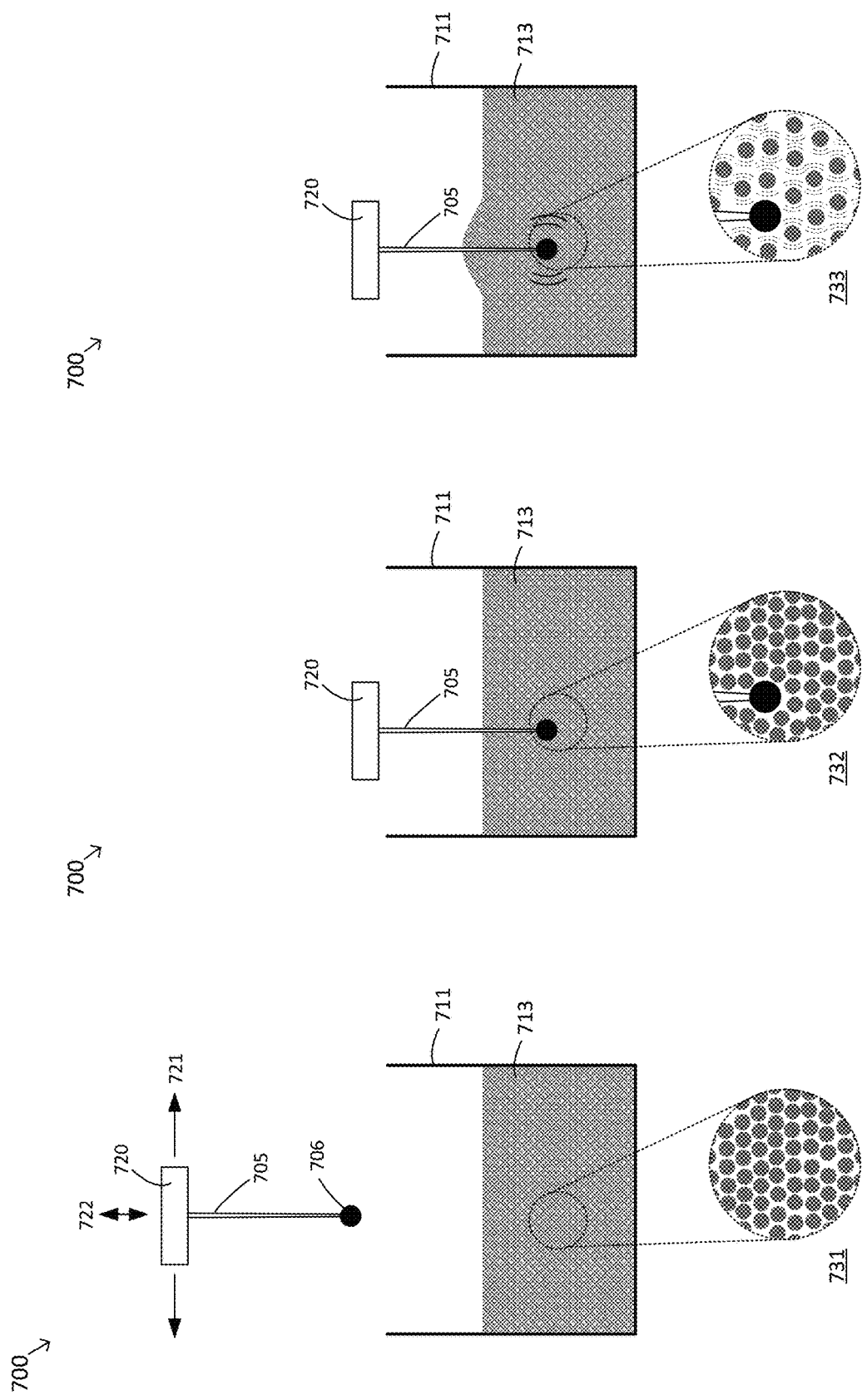

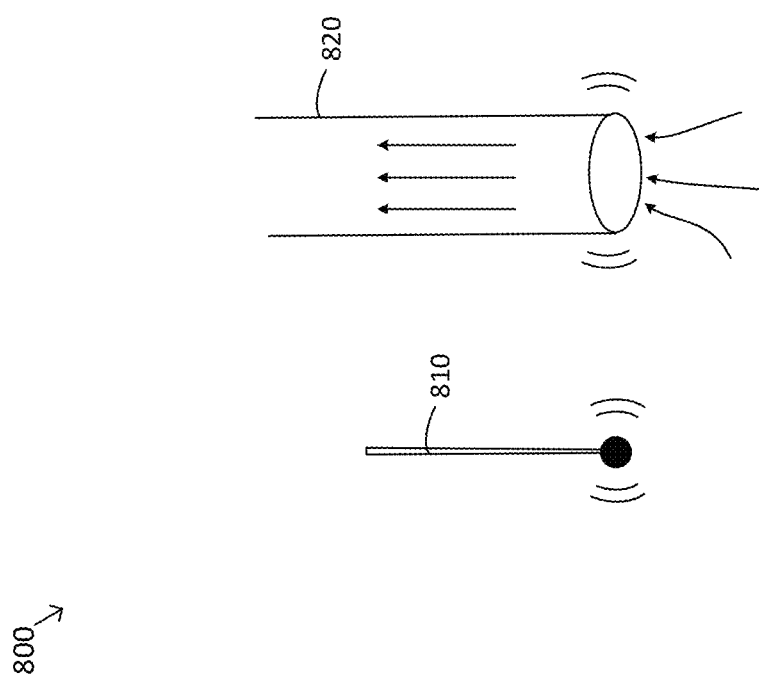

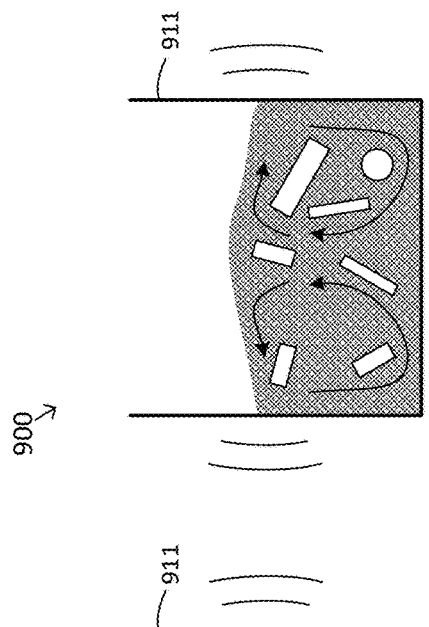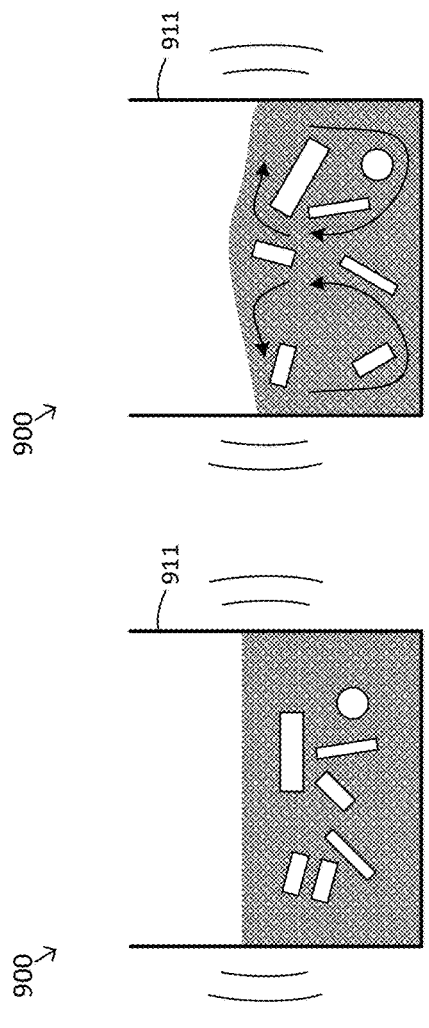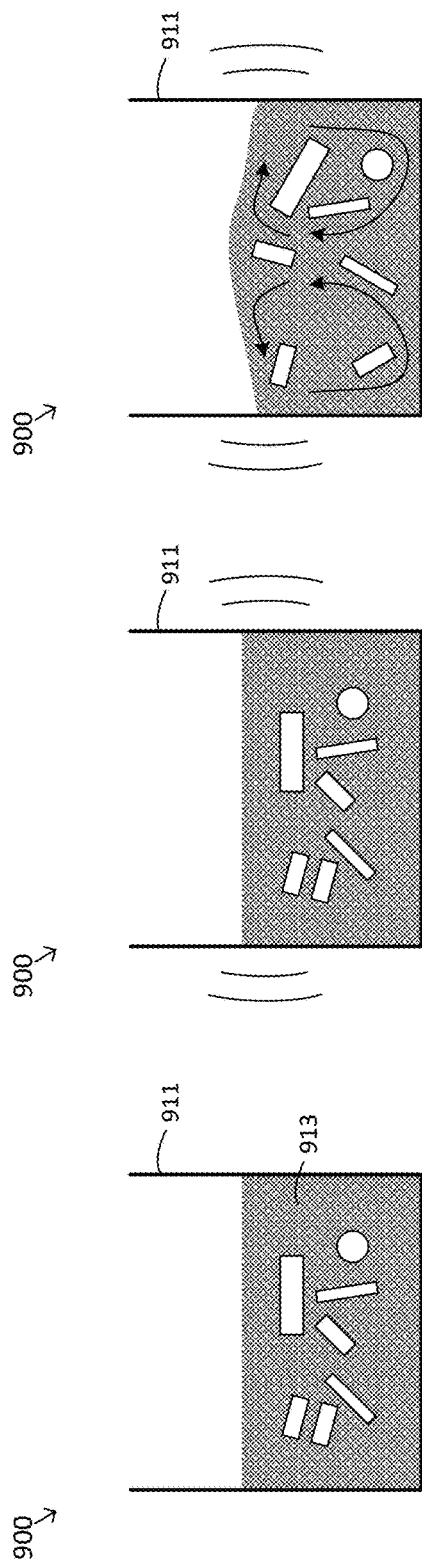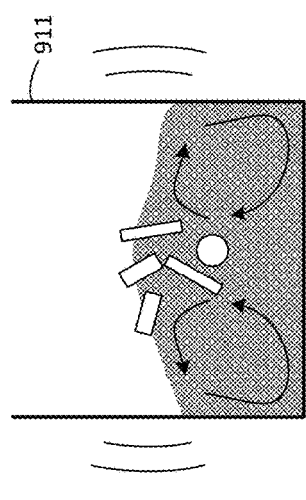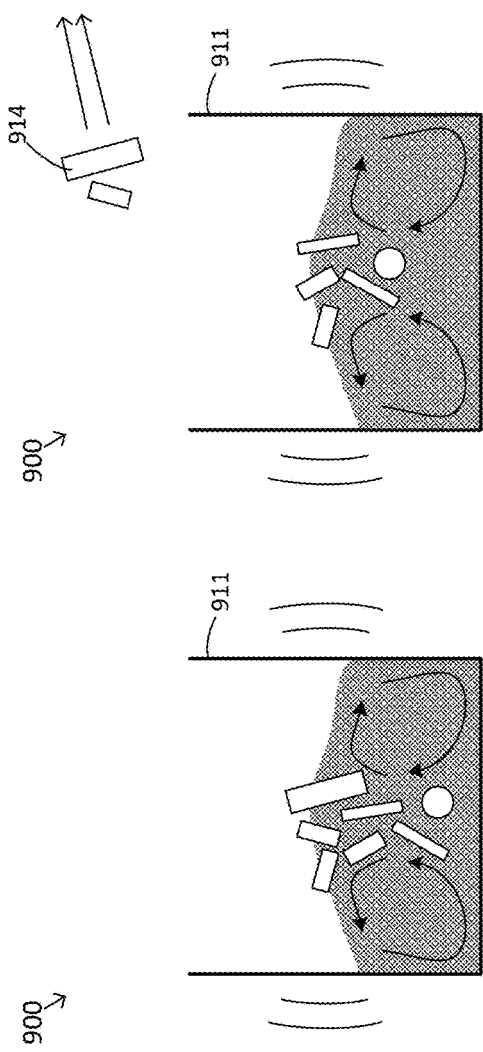

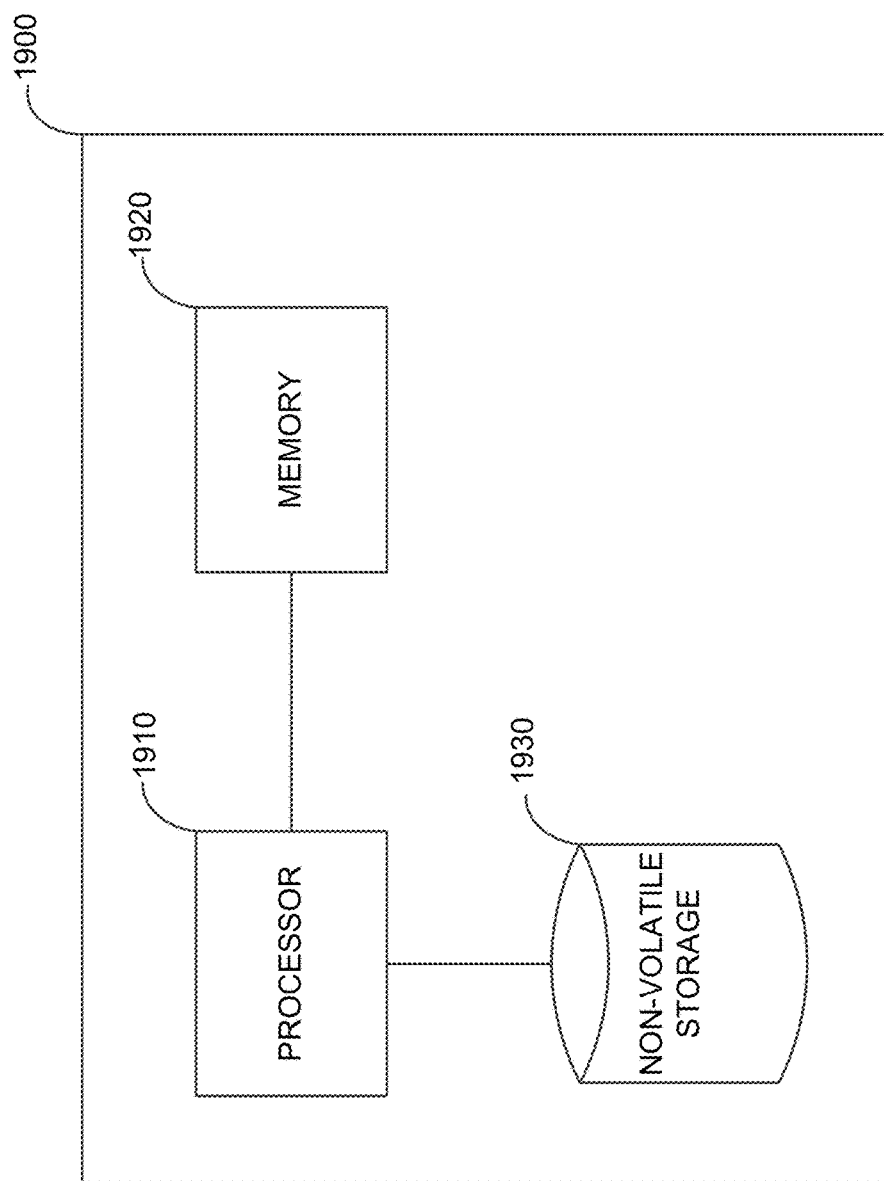

TECHNIQUES FOR DEPOWDERING ADDITIVELY FABRICATED PARTS THROUGH VIBRATORY MOTION AND RELATED SYSTEMS AND METHODS

CROSS REFERENCE TO RELATED APPLICATIONS

The present application claims the benefit under 35 U.S.C. § 119(e) of U.S. Provisional Application No. 62/885,692, filed Aug. 12, 2019, which is hereby incorporated by reference in its entirety.

BACKGROUND

Additive fabrication, e.g. 3-dimensional (3D) printing, provides techniques for fabricating objects, typically by causing portions of a building material to solidify at specific locations. Additive fabrication techniques may include techniques categorized as vat photopolymerization, powder bed fusion, binder jetting, material jetting, sheet lamination, material extrusion, directed energy deposition, or combinations thereof. Many additive fabrication techniques build parts by forming successive layers, which are typically cross-sections of the desired object. Typically each layer is formed such that it adheres to either a previously formed layer or a substrate upon which the part is built.

In some additive fabrication technologies, parts may be fabricated by combining portions of a powder or other granular material to create fully dense parts. For example, additive fabrication techniques known as binder jetting may selectively apply a liquid to portions of a layer of powder, then a subsequent layer of powder may be deposited over the first layer, and additional liquid applied to additional portions of the new layer, and so on. At the end of such a process, the parts are disposed within a volume of the powder from which the parts must be separated.

SUMMARY

According to some aspects, a method is provided for extracting one or more additively fabricated parts from a powder bed comprising a powder and the one or more additively fabricated parts, the method comprising mechanically coupling a build box to a mechanical vibrator, the build box containing the powder bed and having one or more openings in one or more sidewalls of the build box, and operating the mechanical vibrator to vibrate the build box, causing at least some of the powder to escape the build box through the one or more openings.

According to some aspects, an additive fabrication system is provided comprising an additive fabrication device configured to fabricate one or more parts from a powder by directing at least one binding agent onto regions of successive layers of the powder, thereby producing a powder bed comprising the powder and the one or more parts, a build box comprising one or more openings in one or more sidewalls of the build box, the build box configured to be removably inserted into the additive fabrication device and configured to hold the powder bed, and a depowdering device comprising a cavity configured to removably receive the build box, and at least one mechanical vibrator configured to mechanically couple to the build box when the build box is installed within the cavity.

According to some aspects, a method is provided for extracting one or more additively fabricated parts from a powder bed comprising a powder and the one or more additively fabricated parts, the method comprising inserting a probe at least partially into the powder bed, wherein the probe comprises a mechanical vibrator proximate to a suction device, operating the mechanical vibrator to fluidize a region of the powder in the powder bed, and operating the suction device to remove powder from the fluidized region of the powder.

According to some aspects, an apparatus is provided for extracting one or more additively fabricated parts from a powder bed comprising a powder and the one or more additively fabricated parts, the apparatus comprising a probe comprising a mechanical vibrator, and a suction device proximate to the mechanical vibrator, wherein a distal end of the suction device comprises a cylindrical portion and the mechanical vibrator is arranged within an interior of the cylindrical portion of the suction device, and wherein the mechanical vibrator is arranged along a central axis of the cylindrical portion of the suction device.

According to some aspects, a method is provided for extracting one or more additively fabricated parts from a powder bed comprising a powder and the one or more additively fabricated parts, the method comprising mechanically coupling a container to a mechanical vibrator, the container containing the powder bed and having an exposed surface of the powder bed, operating the mechanical vibrator to vibrate the container, wherein said vibration produces granular convection of at least some of the additively fabricated parts within the powder bed, and removing one or more of the additively fabricated parts from the exposed surface of the powder bed.

According to some aspects, an apparatus is provided for extracting one or more additively fabricated parts from a powder bed comprising a powder and the one or more additively fabricated parts, the apparatus comprising a container configured to hold a powder bed comprising a powder and one or more additively fabricated parts, at least one mechanical vibrator mechanically coupled to the container and configured to vibrate the container to produce granular convection of additively fabricated parts within the container, and one or more baskets configured to collect the additively fabricated parts as they move through the container due to said granular convection.

According to some aspects, a method is provided for extracting one or more additively fabricated parts from a powder, the method comprising transferring a mixture of one or more additively fabricated parts and powder onto a tray, the tray having raised edges, vibrating the tray, thereby causing at least some of the powder to overflow over the raised edges, whilst the one or more additively fabricated parts are retained on the tray.

According to some aspects, an additive fabrication system is provided comprising a build box comprising a movable platform onto which a powder bed may be formed, wherein one or more walls of the build box comprise perforated sections, and a depowdering device comprising a cavity configured to removably receive the build box, at least one mechanical vibrator configured to mechanically couple to the build box when the build box is installed within the cavity, and at least one actuator configured to couple to the movable platform of the build box when the build box is installed within the cavity and configured to move the movable platform toward the perforated sections of the one or more walls of the build box.

According to some aspects, a method is provided for extracting one or more additively fabricated parts from a powder, the method comprising obtaining source material comprising powder and one or more additively fabricated parts, depositing at least a portion of the source material onto a plurality of belts having a plurality of holes, and moving the plurality of belts to cause powder from the at least a portion of the source material to fall through holes of the plurality of holes.

According to some aspects, an apparatus is provided for extracting one or more additively fabricated parts from a powder, the apparatus comprising a plurality of belts having a plurality of holes, a chamber comprising one or more inlets and one or more outlets, the chamber configured to be moved over the plurality of belts and to form a hermetic seal with the plurality of belts, at least one actuator configured to move the plurality of belts to, when a source material comprising powder and one or more additively fabricated parts is arranged on the plurality of belts, cause powder to fall through holes of the plurality of holes, and at least one pressure source coupled to the one or more inlets and to the one or more outlets and configured to create a pressure differential between the one or more inlets and the one or more outlets.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 3A-3C depict perspective views of a container of a depowdering system from which powder is removed through vibration, according to some embodiments;

FIGS. 4A-4C depict cross-sectional views of powder being removed from a container containing an opening, according to some embodiments;

FIGS. 7A-7C depict cross-sectional views of an illustrative depowdering system comprising a powder fluidizing device, according to some embodiments;

FIG. 8 depicts an illustrative fluidizing device and associated vacuum, according to some embodiments;

FIGS. 9A-9E depict stages of vibrating a container in a depowdering system to produce granular convection, according to some embodiments;

FIG. 19 illustrates an example of a computing system environment on which aspects of the invention may be implemented.

DETAILED DESCRIPTION

Figure 1:
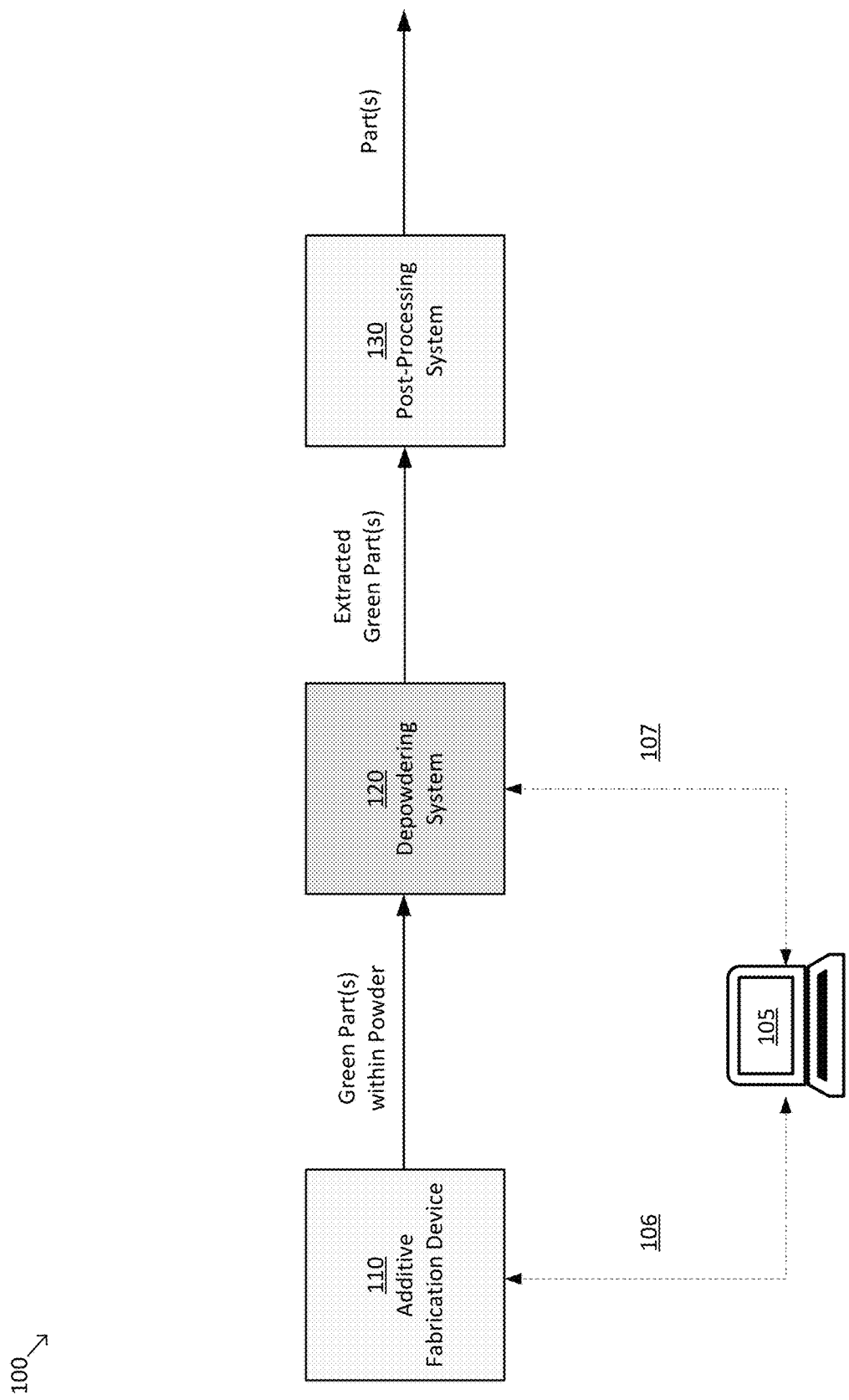
FIG. 1 is a block diagram of an additive fabrication system that includes a depowdering sub-system, according to some embodiments.

As discussed above, some additive manufacturing techniques fabricate parts from and within a granular material such as a powder. One example is binder jetting, in which parts are formed by applying a liquid (e.g., a binder) to regions of successive layers of powder, thereby producing parts (which are 'bound' regions of the powder) within a volume of unbound powder. Such parts are often referred to as "green" parts since they must undergo subsequent processing, such as sintering, to produce a final part. Other illustrative additive fabrication techniques that fabricate parts from a powder include direct laser melting, direct metal laser sintering, or selective laser sintering, in which regions of successive layers of a material (e.g., metal, nylon) are melted through application of directed energy.

Irrespective of how parts are formed from a powder or other granular material, subsequent to the additive fabrication process these parts are accessed by separating the parts from the material. This process of retrieving parts from a granular material in which the parts are formed is referred to herein as "depowdering," although it will be appreciated that techniques described herein are not limited to use cases in which the additional material comprises or consists of a powder. As such, while the discussion below may focus primarily on separating parts from a powder, it will be appreciated that any discussion of depowdering may also apply to separating additively fabricated parts from other granular materials.

Depowdering is frequently a laborious process due to the fine nature of the powder. Handling of the powder may cause a great deal of mess and, depending on the powder material, may also present safety concerns due to inhalation or flammability. Typically, depowdering is performed in a manual process of excavation that utilizes vacuum hoses and brushes to separate the parts from the powder. This process can take a great deal of time and in cases where the parts are fragile, can result in damage to the parts during excavation. Moreover, many powders used for additive fabrication, such as metal and/or ceramic powders, may exhibit low flowability which makes moving particles of the powder difficult due to the tendency of the powder to "clump" rather than flow away from the additively fabricated parts.

While, as discussed above, there are multiple additive fabrication technologies for which depowdering is performed, the process of depowdering may not be equally straightforward for each of these technologies. For instance, direct laser melting may produce metal parts during additive fabrication so that, prior to depowdering, the parts are embedded within a metal powder. Since the parts are solid metal, there is typically not a significant risk of damage to the parts during depowdering and so a wide range of simple techniques may be effective at separating the parts from the powder. In contrast, green parts produced in binder jetting comprise regions of bound powder held together by a liquid and may be considerably more fragile than parts produced by direct laser melting. Consequently, depowdering approaches that are effective for direct laser melting or selective laser sintering may not be suitable for parts produced through binder jetting since they may cause damage to the parts.

The inventors have recognized and appreciated techniques for depowdering that separate powder from parts through vibration of the powder, the parts, and/or structures mechanically connected with the powder and/or parts. For instance, the application of vibration may dislodge, aerate and/or otherwise increase the flowability of regions of the powder, thereby making it easier to remove the powder with a suitable means. In some cases, vibration may cause powder to move relative to parts such that the parts can be more easily separated from the powder. Some of the depowdering techniques described herein may utilize a porous structure that powder, but not parts, can pass through. In such techniques, the application of vibration may cause, or may facilitate, the passage of powder through the porous structure to thereby separate the powder from parts.

The approaches described herein generally mobilize the powder and separate it from the parts by utilizing the fact that powder is lighter and more movable than the parts embedded within it. While some green parts, such as green parts produced by binder jetting, may be fragile with respect to scraping or impacts, such parts may nonetheless be resistant to damage from motion produced by vibration, especially when the parts are cushioned by surrounding powder. Many of the techniques described herein for depowdering through application of vibration may be automated, as discussed further below, thereby mitigating the above-described challenges associated with manual depowdering operations.

According to some embodiments, techniques described herein for depowdering parts through vibration may be applied by a depowdering system that is separate from an additive fabrication device that fabricated the parts. This approach may provide advantages for throughput, since it may allow for an additive fabrication device to begin fabricating a second group of parts while a first group of parts is being depowdered. Moreover, in use cases in which additive fabrication takes more or less time than the subsequent depowdering step, multiple additive fabrication devices and/or depowdering systems may be employed to minimize downtime of the additive fabrication device(s) and depowdering system(s). For instance, in a simple case where additive fabrication takes half as long as depowdering, two depowdering systems could be operated in parallel so that the additive fabrication device and the two depowdering systems could be operated continuously to maximize throughput.

According to some embodiments, a depowdering system as described herein may be configured to receive a build box from an additive fabrication device and to perform depowdering on contents of the build box. As referred to herein, a "build box" includes any structure in which parts may be fabricated within a powder by an additive fabrication device, and that may be removed from the additive fabrication device subsequent to fabrication. In some embodiments, a depowdering system may be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering the subsection, metering another subsection, etc.

Irrespective of how a depowdering system may be configured to operate upon the contents of a build box, the depowdering system may be configured with a receptacle sized for the build box such that the build box can be removably mounted or otherwise removably attached to the depowdering system. Subsequent to depowdering, a build box may be removed from the depowdering system and reused for fabrication. At this stage in the process, the build box may, for instance, be empty or may contain only powder, depending on the particular type of depowdering operations performed as discussed below.

According to some embodiments, a depowdering system may comprise a container that includes openings on its sides that are large enough to allow powder to flow through but small enough so that no parts will flow through the openings. Many powders used for additive fabrication have a tendency to clump such that little to no powder may flow through adjacent openings, even when the powder is located within, or very close to, the openings. This clumping behavior may be the result of numerous interparticle forces, such as electrostatic interactions, capillary effects, physical interlocking of particles in the powder, tacky coatings which may be present on some particles in the powder, and so on. The container may be vibrated to increase the flowability of the powder within the container, causing (or increasing the rate at which) powder flows out of the openings. In some embodiments, the container may be a build box that was transferred to the depowdering system. In such cases, the openings in the build box may be arranged in portions of the build box that are not typically exposed to powder during additive fabrication of parts within the build box.

According to some embodiments, vibration may be applied to a mixture of powder and parts while a secondary technique for removing the powder is applied. For instance, the vibration may cause the powder to fluidize or otherwise loosen, while a secondary tool such as a vacuum or forced air is applied to remove the loosened powder from the mixture.

According to some embodiments, a depowdering system may comprise a tool having one or more vibrating elements that may be inserted into a mixture of powder and parts. A vibrating element may loosen and/or otherwise increase the flowability of regions of the powder proximate to the vibrating element. Such a tool, which may also be referred to herein as a "probe," may be combined with other depowdering techniques, including but not limited to those employing vibration, to remove powder that has increased flowability as a result of the tool's vibration.

According to some embodiments, a depowdering system may comprise a container and may be configured to move the container so as to produce granular convection of powder and/or parts within the container. Granular convection refers to a phenomenon observed when a container filled with objects of different sizes and/or masses is agitated. In particular, objects may rearrange and organize themselves within the container. For instance, the objects may organize themselves vertically with smaller and/or lighter objects toward the bottom and larger and/or heavier objects toward the top. Objects may move within the container according to convection currents that cause parts and powder to move in respective directions that depend on the geometry of the container.

According to some embodiments, a mixture of parts and powder may be arranged on an open vessel, such as a tray, that is vibrated to cause the parts and powder to spread out over the vessel. A threshold around the perimeter of the vessel may be arranged to inhibit parts from falling out of the vessel, yet allow powder to pass through and/or over the threshold. As a result, powder may be removed from the mixture while retaining the parts within the vessel.

According to some embodiments, a depowdering system may comprise one or more belts configured to move parts (or parts embedded within powder) between devices of the depowdering system and/or between an additive fabrication device and the depowdering system. In some cases, the one or more belts may include belts configured to vibrate to cause powder to fall between the belts while parts remain on the belts.

Reference is made herein to techniques in which depowdering operations are applied to parts embedded within powder. Generally, subsequent to excavation of such parts additional powder may still be adhered to the surface and additional depowdering may be necessary to produce a completely clean part. These two different types of depowdering are referred to herein as "coarse" and "fine" depowdering, wherein "coarse" depowdering broadly refers to excavating parts from powder and "fine" depowdering broadly refers to removing comparatively small amounts of powder from the surface of an excavated part. It will be appreciated that, the use of these terms notwithstanding, depowdering operations need not be rigidly categorized into purely coarse or purely fine depowdering operations. As such, these terms are used merely to aid description of the types of effects that may be produced by the techniques described herein, and should not be viewed as limiting.

Reference is made herein to techniques for vibrating, producing vibration of, or producing vibratory motion of, one or more components of a depowdering system. It will be appreciated that any suitable mechanical devices may be operated to perform such techniques, and may either be arranged to contact such components or to mechanically couple to such components via one or more intermediate structures. For instance, in some cases, a structure may be arranged in contact with a surface of a secondary structure, which is coupled to one or more actuators for producing vibration. Vibration of the actuators may thereby vibrate the structure via its mechanical contact to the secondary structure. Additionally, or alternatively, in some cases one or more actuators for producing vibration may be attached to (or may otherwise contact) a structure and operated to vibrate the structure.

In some embodiments, a depowdering system may comprise a cavity configured to removably receive a build box. The depowdering system may comprise one or more actuators (or structures coupled to one or more actuators) that contact the build box when it is installed within the cavity. As a result, the depowdering system may be operated to vibrate at least part of the build box by operating the actuators.

Suitable actuators for producing vibration, which may also be referred to herein as mechanical vibrators, may include, but are not limited to, eccentric rotating mass (ERM) vibration motors; linear resonant actuators (LRA) such as rectangular LRAs; coin vibration motors such as LRA, brushless, or double-magnet brush type motors; cylindrical vibration motors, spring contact vibration motors, thru-hole vibration motors, encapsulated vibration motors, air-powered vibrators (e.g., a linear actuator in which a piston is actuated by aid along an axis, a rotary actuator in which air pushes a ball around in a chamber), or combinations thereof. An actuator for producing vibration (or mechanical vibrator) may produce vibration through any suitable technique(s), including via piezoelectric and/or magnetic techniques. Motion of an actuator for producing vibration (or mechanical vibrator) may include linear, rotary, angular and/or orbital motion. Any techniques that relate to vibration described herein will be understood to encompass each of these techniques for producing vibration in any suitable combination, as the techniques are not limited to any particular technology for operating a depowdering system to produce vibration.

Following below are more detailed descriptions of various concepts related to, and embodiments of, techniques for depowdering additively fabricated parts using vibration. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of an additive fabrication system that includes a depowdering sub-system, according to some embodiments. System 100 includes an additive fabrication device 110, a depowdering system 120, a post-processing system 130 and computing device 105. System 100 may, for instance, represent the production pipeline for an additive fabrication technology in which parts are fabricated from a powder, examples of which may include binder jetting, direct metal laser sintering, direct laser melting or selective laser sintering. In general, any number of each of additive fabrication device 110, depowdering system 120 and post-processing system 130 may be included in such a pipeline, although a single instance of each will be discussed in relation to FIG. 1 for simplicity. As discussed above, a system that includes multiple devices at a given stage in the pipeline may provide for increased throughput by minimizing downtime of the devices in the pipeline.

In the example of FIG. 1, the additive fabrication device 110 may be configured to fabricate three-dimensional parts from one or more source materials. In particular, the additive fabrication device 110 may be configured to fabricate the parts from a powder or other granular source material. According to some embodiments, the source material may include a metal powder and/or a ceramic powder. Depending on the particular embodiment, a source material may for instance comprise a pure metal powder, a metal alloy powder, an intermetallic compound powder, one or more powder compounds containing at least one metallic element, and/or one or more ceramic powders. In some embodiments, the source material comprises pre-alloyed atomized metallic powders, a water or gas atomized powder, a mixture of a master alloy powder and an elemental powder, a mixture of elemental powders selected to form a desired microstructure upon the interaction of the elemental species (e.g., reaction and/or interdiffusion) during a post-processing step (e.g., sintering), one or more ceramic powders, and/or any other suitable materials. In some instances, the source material may comprise a sinterable powder, and/or the source material may be compatible with an infiltration process. Moreover, the source material may contain such wetting agents, flow improvers, coatings, and other powder modifications found to be useful in the sintering or infiltration of additively fabricated parts. Accordingly, it should be understood that the current disclosure is not limited to any particular material and/or combination of materials comprising the source material, nor is the current disclosure is limited to any particular type of additive manufacturing process.

As one non-limiting example of a suitable additive fabrication device 110, the additive fabrication device may include a material deposition mechanism which be operated to deposit source material onto a powder, and a print head which may be controlled to move across the powder to deliver liquid such as a binder onto the powder. In some cases, an additional device such as a roller may be operated to move over the deposited source material to spread the source material evenly over the surface. The print head may include one or more orifices through which a liquid (e.g., a binder) can be delivered from the print head to each layer of the source material. In certain embodiments, the print head can include one or more piezoelectric elements, and each piezoelectric element may be associated with a respective orifice and, in use, each piezoelectric element can be selectively actuated such that displacement of the piezoelectric element can expel liquid from the respective orifice.

In this illustrative embodiment of the additive fabrication device 110, the print head may be controlled (e.g., by computing device 105) to deliver liquid such as a binder onto a powder in predetermined two-dimensional patterns, with each pattern corresponding to a respective layer of a three-dimensional part. In this manner, the delivery of the binder may perform a printing operation in which the source material in each respective layer of the three-dimensional part is selectively joined along the predetermined two-dimensional layers. After each layer of the part is formed as described above, the platform may be moved down and a new layer of powder deposited, binder again applied to the new powder, etc. until the part has been formed.

In the example of FIG. 1, parts produced by the additive fabrication device 110 may be referred to as "green" parts since they must undergo subsequent processing to produce a final part. Moreover, the parts produced by the additive fabrication device 110 may be contained within a volume of powder or other granular material, necessitating their extraction by the depowdering system 120. Various embodiments of the depowdering system (and/or elements of the depowdering system 120) are discussed further below.

Post-processing system 130 may include one or more devices suitable for transforming an extracted green part into a final part, which may include one or more debinding devices and/or furnaces. In systems employing a binder jetting process, extracted green parts can undergo one or more debinding processes in the post-processing system 130 to remove all or a portion of the binder system from the parts. As such, post-processing system 130 may include a thermal debinding device, a supercritical fluid debinding device, a catalytic debinding device, a solvent debinding device, or combinations thereof. In some embodiments, post-processing system 130 may include a furnace. Extracted green parts may undergo sintering in the furnace such that particles of the powder (or other granular material) combine with one another to form a finished part. In some embodiments, a furnace may be configured to perform one or more debinding processes within the furnace while extracted green parts undergo sintering.

According to some embodiments, the production of parts by system 100 may be partially or fully automated. In particular, the system may be configured to move parts embedded within powder from the additive fabrication device 110 to the depowdering system 120, and/or may be configured to move parts from the depowdering system 120 to the post-processing system 130. Automated motion may comprise one or more robotics system and/or conveyor belts, which may be configured to move parts (or parts embedded within powder) between devices in system 100, which may include motion between the three stages 110, 120 and 130 depicted in FIG. 1 and/or may be configured to move parts internally to one of the stages (e.g., moving parts between two depowdering devices of depowdering system 120). Automated motion may include automated removal of a build box from a device and/or insertion of a build box into a device. For instance, in some embodiments a build box may be automatically removed from the additive fabrication device 110 and automatically moved to, and inserted into, a component of depowdering system 120.

In some embodiments, the additive fabrication device 110 may fabricate parts within a build box, which may be automatically transferred from the additive fabrication device to the depowdering system 120. Depowdering system 120 may, as discussed above, be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering it, metering another subsection, etc.

According to some embodiments, automated movement as described above may be controlled by computing device 105. In the example of FIG. 1, computing device 105 is provided as an illustrative example of a suitable controller that may be configured to control various automated operations of the additive fabrication device 110 and/or depowdering system 120. However, it will be appreciated that system 100 may also be operated by multiple separate computing devices, including standalone computing devices and/or computing devices installed within the additive fabrication device 110, depowdering system 120 or post-processing system 130. Such computing devices may or may not be coupled to one another. As such, it will be appreciated that the below discussion of the various computational tasks that computing device 105 may be configured to perform need not be implemented using a single computing device as shown, but could be implemented on any number of different computing devices, which may be located within, or separate from, any of the elements of system 100. In particular, some computational tasks may be implemented by one such computing device but not another so that different computing devices may be configured to perform different functions from one another.

According to some embodiments, computing device 105 may be configured to generate two-dimensional layers that may each comprise sections of an object. Instructions may then be generated from this layer data to be provided to additive fabrication device 110 that, when executed by the device, fabricates the layers and thereby fabricates the object. Such instructions may be communicated via a communication link 106, which may comprise any suitable wired and/or wireless communications connection. In some embodiments, a single housing may hold the computing device 105 and additive fabrication device 110 such that the link 106 is an internal link connecting two modules within the housing of the device.

According to some embodiments, computing device 105 may be configured to receive, access, or otherwise obtain instructions generated to cause the additive fabrication device 110 to fabricate one or more parts, and may execute said instructions, thereby causing the additive fabrication device to fabricate the one or more parts. For instance, the instructions may control one or more motors of the additive fabrication device 110 to move components of the device to deposit powder, deposit liquid binder onto a layer of the powder, etc.

According to some embodiments, computing device 105 may be configured to generate instructions that, when executed by the depowdering system 120, automatically performs depowdering operations, examples of which are described below. Such instructions may be communicated via a communication link 107, which may comprise any suitable wired and/or wireless communications connection. In some embodiments, a single housing may hold the computing device 105 and depowdering system 120 such that the link 107 is an internal link connecting two modules within the housing of a device of the system.

In some embodiments, instructions to be executed by the depowdering system 120 may be generated based on the geometry of parts to be fabricated (or that were fabricated) by the additive fabrication device 120. As discussed further below, certain depowdering techniques may be based on, or may be improved by, removing powder from locations having a known relative location to parts within the powder. In some cases, instructions to be executed by the depowdering system 120 may be generated based on the locations of parts within the powder bed of the additive fabrication device 110 (or the expected locations after fabrication). As such, instructions to cause the additive fabrication device 110 to fabricate one or more parts may be generated by the computing device 105 as part of the same operation in which instructions are generated to be executed by the depowdering system 120. For example, computing device 105 may perform computational operations to arrange one or more parts to be fabricated within a three-dimensional volume representing the build volume of the additive fabrication device. The computing device 105 may then perform slicing of the parts in the volume and generate instructions for the additive fabrication device 110 to form successive layers of the parts, and in addition, may also generate instructions to be executed by the depowdering system based on the location and geometry of the parts within the volume.

As discussed above, a depowdering system may be perform depowdering on contents of a build box, either by directly depowdering parts within the build box while the parts are largely contained within the build box, or by metering contents of the build box into or onto an apparatus within the depowdering system. As examples of these two types of approaches, FIGS. 2A-2E depict illustrative operations that may be performed by a depowdering system to prepare the contents of a build box for depowdering operations, according to some embodiments.

In each of the examples of FIG. 2A-2E, some portion of a mixture of powder and parts is prepared for one or more depowdering operations. A mixture of powder and parts so prepared may be referred to herein as a "powder bed," irrespective of whether the mixture represents the entire contents of a build box or some subset of the contents of a build box, and irrespective of whether the mixture is held or supported by the build box or has been removed entirely from the build box. Accordingly, techniques described below as being applied to a powder bed may be understood as being applicable to any mixture of powder and parts, including but not limited to the various results of the operations of FIGS. 2A-2E.

Figure 2A:
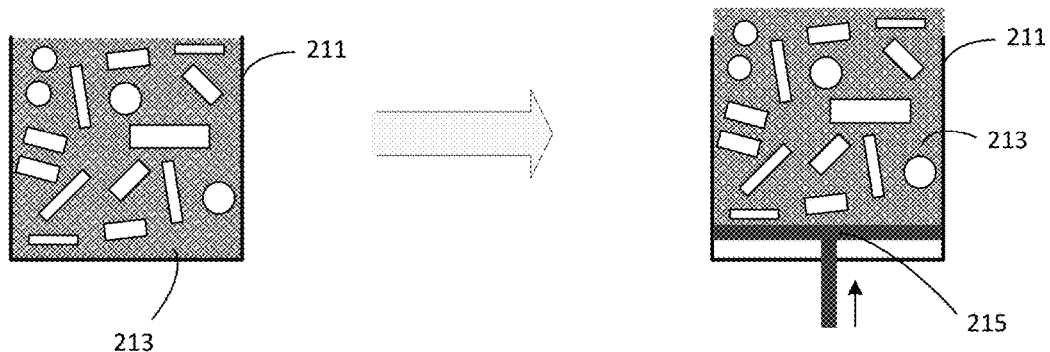
FIGS. 2A-2E depict illustrative operations that may be performed by a depowdering system to prepare the contents of a build box for depowdering, according to some embodiments.

In the example of FIG. 2A, a build box 211 initially comprises a mixture of powder and parts 213. Subsequently, a bottom surface of the build box is pushed upward by a delivery mechanism 215, which causes an upper section of the mixture of powder and parts 213 to be pushed beyond the upper edges of the build box. According to some embodiments, the build box 211 may comprise a plate arranged over the bottom of the build box onto which the powder and parts may be deposited. The delivery mechanism 215 may then engage with the plate and push it upwards within the build box. Alternatively, the bottom of the build box may be movable and the delivery mechanism 215 may engage with the bottom of the box and push it upwards.

Figure 2B:
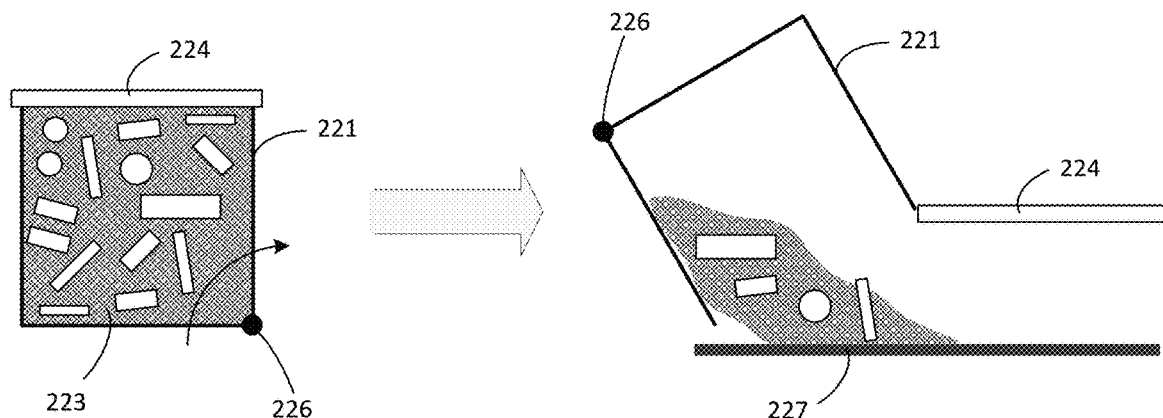

In the example of FIG. 2B, a build box 221 initially comprises a mixture of powder and parts 223 and has a cover 224 over the contents of the build box. Subsequently, the build box may be rotated around axis 226 and the lid may be automatically opened, thereby spilling contents of the build box 221 onto a desired surface 227.

Figure 2C:
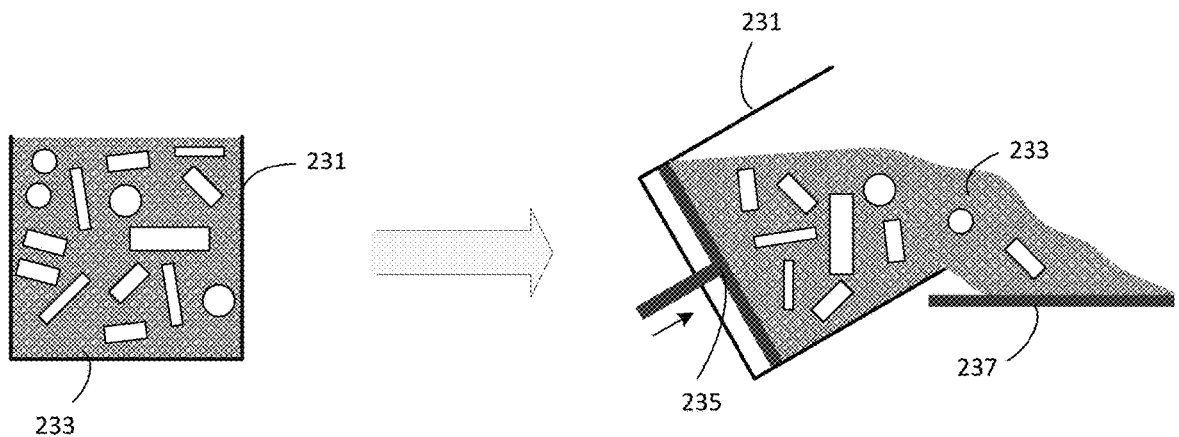

In the example of FIG. 2C, a build box 231 initially comprises a mixture of powder and parts 233. Subsequently, a bottom surface of the build box is pushed upward by a delivery mechanism 235, which causes an upper section of the mixture of powder and parts 233 to be pushed beyond the upper edges of the build box. Simultaneously, the build box is rotated, the combination of which cause contents of the build box to spill onto a desired surface 237. According to some embodiments, the build box 231 may comprise a plate arranged over the bottom of the build box onto which the powder and parts may be deposited. The delivery mechanism 235 may then engage with the plate and push it upwards within the build box. Alternatively, the bottom of the build box may be movable and the delivery mechanism 235 may engage with the bottom of the box and push it upwards.

Figure 2D:
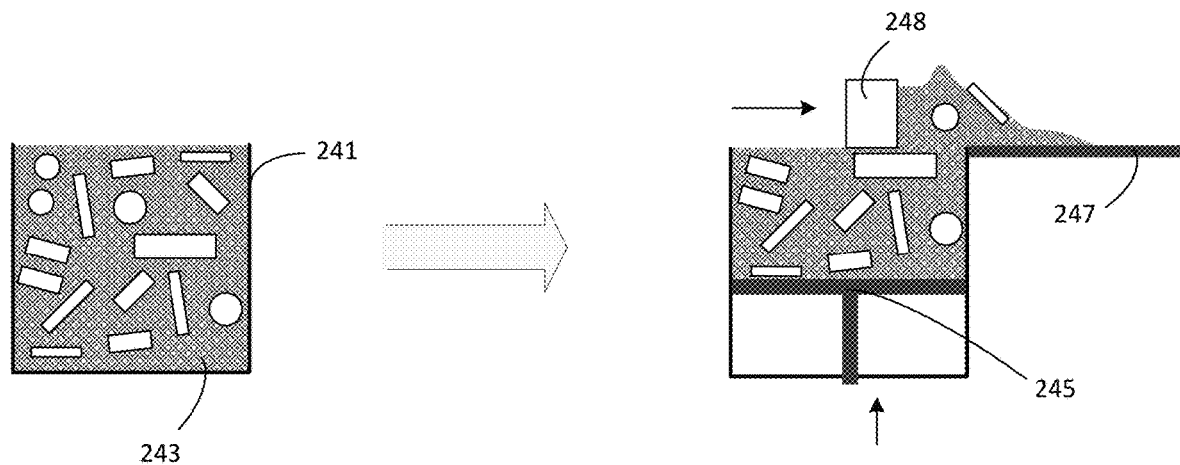

In the example of FIG. 2D, a build box 241 initially comprises a mixture of powder and parts 243. Subsequently, a bottom surface of the build box is pushed upward by a delivery mechanism 245, which causes an upper section of the mixture of powder and parts 243 to be exposed above the upper edges of the build box. Simultaneously or subsequently, a scraper 248 is moved over the surface of the build box, pushing the exposed powder and/or parts onto an adjacent surface 247. The scraper may for instance be wider than the box build and coupled to one or more actuators configured to move the scraper over the opening of the build box. According to some embodiments, the build box 241 may comprise a plate arranged over the bottom of the build box onto which the powder and parts may be deposited. The delivery mechanism 245 may then engage with the plate and push it upwards within the build box. Alternatively, the bottom of the build box may be movable and the delivery mechanism 245 may engage with the bottom of the box and push it upwards.

Figure 2E:
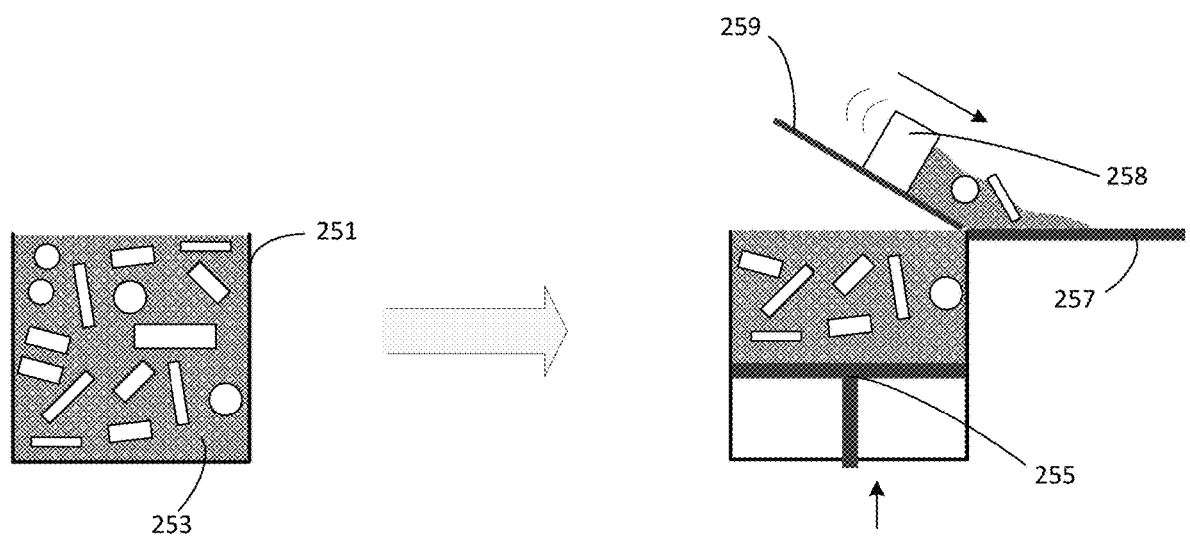

In the example of FIG. 2E, a build box 251 initially comprises a mixture of powder and parts 253. Subsequently, a bottom surface of the build box is pushed upward by a delivery mechanism 245, which causes an upper section of the mixture of powder and parts 243 to be exposed above the upper edges of the build box. Simultaneously or subsequently, a plate 259 is inserted into the exposed mixture of powder and parts and raised to incline the mixture on the plate 259. Simultaneously with insertion or inclination of the plate 259, or subsequently, scraper 258 is moved along the plate 259 to push the separated portion of the mixture 253 onto surface 257. In some cases, the plate 259 may be vibrated to aid the mixture of powder and parts to slide down the include onto surface 257. According to some embodiments, the build box 251 may comprise a plate arranged over the bottom of the build box onto which the powder and parts may be deposited. The delivery mechanism 255 may then engage with the plate and push it upwards within the build box. Alternatively, the bottom of the build box may be movable and the delivery mechanism 255 may engage with the bottom of the box and push it upwards.

In each of the examples of FIGS. 2A-2E, where components are described above as being moved, said motion may comprise, in each individual case, any combination of manual and/or automated motion. Automated motion may include execution of instructions by a suitable computing device to operate one or more components of the depowdering system 120, such as one or more actuators, to produce motion and/or may include motion produced by a user manually interacting with the depowdering system 120 (e.g., presses a button), which then automatically operates the one or more components of the depowdering system 120 to produce motion.

FIGS. 3A-3C depict perspective views of a sequence in which powder is removed, through vibration, from a container containing an opening, according to some embodiments. In the example of FIGS. 3A-3C, depowdering system 300 includes a container 311 containing a mixture of powder and parts 313, and has an opening 314 arranged on a side of the container.

As discussed above, due to the tendency of powders used in additive fabrication to clump or cohere to one another, even with opening 314 positioned on the side of the container 311, little to no powder may be expected to naturally flow through the opening. As a result, the arrangement shown in FIG. 3A may not naturally provide for depowdering of the parts within the container 311.

In FIG. 3B, the depowdering system 300 applies vibration to the container 311, which may cause the powder within the container to flow more easily through the opening 314, and therefore be separated from the parts inside the container. The opening 314 may be configured with a size and/or shape such that parts cannot fit through the opening, whereas the much smaller particles of the can fit through the opening. The depowdering system may be operated to continuously apply the vibration for a period of time during which the powder flows through the opening.

As a result of this process, over time the bulk of the powder within the container may flow out through the opening, eventually leaving the parts within the container along with a relatively small amount of powder, as shown in FIG. 3C. Not all of the parts shown in FIGS. 3A and 3B are shown in the example of FIG. 3C purely for clarity.

In some embodiments, the depowdering system 300 may comprise a hopper or any other suitable container or vessel for catching powder particles flowing out of the container 311 (not shown in the figures).

Various different types of openings may be envisioned as opening 314 other than the slot type opening shown in FIGS. 3A-3C. According to some embodiments, the opening 314 may comprise a plurality of small openings, such as a mesh or grill, or an array of holes, that may provide for a wide area over which powder can escape while still limiting parts from escaping. Any number of openings may be arranged within the container 311, of any suitable type(s), and on any number of sides of the container.

According to some embodiments, opening 314 may be configured to be actuated open and closed by the depowdering system. A door or other cover may be arranged over the opening and coupled to one or more actuators that may be operated by the depowdering system to open and close the opening and thereby control whether or not the mixture of powder and parts 313 within the container is exposed to the environment around the container. In some cases, the cover may slide (e.g., parallel to the walls of the container) and/or hinge (e.g., outwards from the container) when opening. An actuatable opening may have a benefit of allowing for motion of the container while powder is located next to the opening without there being a concern that jostling of the container during movement may cause powder to escape from the container.

According to some embodiments, container 311 may be a build box. As discussed above, a build box may be installed within an additive fabrication device and parts fabricated within the build box, which may then be transferred to a depowdering system for automated removal of powder from the build box. In the example of FIGS. 3A-3C, the container 311 may represent a build box configured with an opening 314 through its surface. The build box may be arranged in the depowdering system 300 in the same orientation as when the build box was previously installed within the additive fabrication device, or may be inverted relative to that orientation.

For example, in some embodiments the opening 314 may be located above the deposited powder when the build box is arranged within the additive fabrication device (e.g., near the top of the build box), and the container may then be covered and inverted to produce the arrangement shown in FIGS. 3A-3C. As another example, in some embodiments when the build box is arranged within the additive fabrication device, the opening 314 may be located below a build plate within the build box and powder deposited onto the build plate during additive fabrication. After installation of the build box in the depowdering system 300 in the same orientation as for additive fabrication, the build plate may be lowered by the depowdering system (e.g., as discussed above in relation to FIGS. 2A, 2D and 2E) so that powder is moved proximate to the opening 314.

According to some embodiments, the container 311 may comprise a platform (e.g., a build plate) within the interior of the container on which the mixture of powder and parts 313 is situated. In such cases, vibration may be applied to the platform to produce the aforementioned flow of powder through the opening 314. In some embodiments, the depowdering system may be operated to apply vibration to the platform, to the walls of the container, or to both the platform and the walls by operating mechanical vibrators coupled thereto. Where vibration is applied to only the platform or the walls, it will be appreciated that vibration applied to the platform may cause vibration of the walls as a secondary effect, or that vibration applied to the walls may cause vibration of the platform as a secondary effect.

According to some embodiments, depowdering system 300 may be configured to detect installation of the container 311 within the depowdering system. The depowdering system may be configured to initiate vibration of the container only when the container is detected to be properly installed. For instance, one or more processors of the depowdering system may be configured to receive signals from one or more sensors that indicate whether or not a container is installed in the depowdering system, and to initiate vibration of the container only when said signals indicate the container is installed.

FIGS. 4A-4C depict cross-sectional views of powder being removed, through vibration, from a container containing an opening, according to some embodiments. FIGS. 4A-4C depict a container 411 in a depowdering system 400, where the container includes an opening 414 and holds a mixture of parts and powder 413. Depowdering system 400 includes a delivery mechanism 415. In the example of FIGS. 4A-4C, the container 411 may comprise a plate arranged over the bottom of the container onto which the powder and parts 413 may be deposited. The delivery mechanism 415 may then engage with the plate and move it within the container. Alternatively, the bottom of the container may be movable and the delivery mechanism 415 may engage with the bottom of the container and move it upwards or downwards.

As shown in FIG. 4A, the opening 414 in container 411 is arranged beneath the bottom of the powder and parts mixture 413. Consequently, the delivery mechanism may be operated to move downwards prior to depowdering. FIG. 4A may represent one example of utilizing a build box from an additive fabrication device as container 411, wherein the build plate (which may be part of, or may instead simply contact, the delivery mechanism 415), was arranged above the opening 414 during additive fabrication.

FIG. 4B illustrates a configuration of depowdering system 400 subsequent to that shown in FIG. 4A, wherein the delivery mechanism has been operated to lower the mixture of powder and parts proximate to the opening 414, and the container 411 and/or delivery mechanism 415 is vibrated to cause the powder to flow through the opening.

FIG. 4C illustrates an alternative configuration of depowdering system 400 subsequent to that shown in FIG. 4A, wherein the delivery mechanism is configured to tilt to aid with removal of the powder. In particular, a side of the delivery mechanism proximate to the side of the container that includes opening 414 is lowered while an opposing side of the delivery mechanism is held at a higher position (although may still be lowered to some extent subsequent to the arrangement of FIG. 4A if necessary). The container 411 and/or delivery mechanism 415 may be vibrated to cause the powder to flow through the opening, wherein gravity assists said flow of powder due to the tilt of the lower bounding surface of the container represented by the delivery mechanism (or other surface such as a build plate, with which it is in contact).

Figure 5:
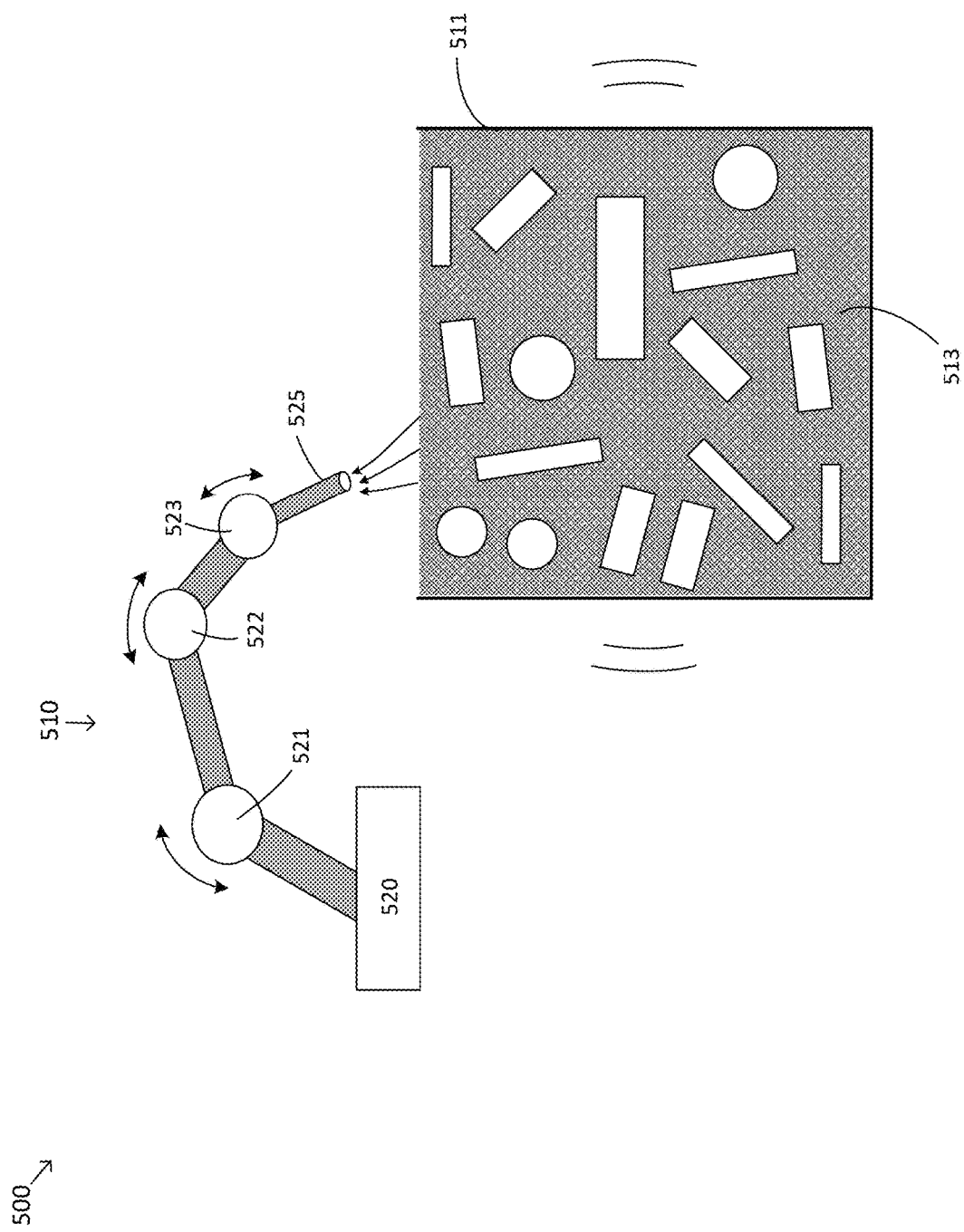
FIG. 5 depicts a cross-sectional view of an illustrative depowdering system comprising a vacuum system and a container configured to vibrate, according to some embodiments.

FIG. 5 depicts a cross-sectional view of an illustrative depowdering system comprising a vacuum system and a container configured to vibrate, according to some embodiments. In the example of FIG. 5, container 511 comprises a mixture of powder and parts 513 and is operable by depowdering system 500 to vibrate to fluidize the powder.

In the example of FIG. 5, depowdering system 500 includes a vacuum nozzle 525 which may be operated to move to desired locations on the surface of the powder bed 513. While a vacuum may be expected to successfully extract powder from a powder bed that is at rest, the vibration of container 511 may improve the ability of the vacuum to remove powder because the powder does not, as discussed above, clump together to the same extent when undergoing vibration compared with powder at rest. Various different systems for removing powder may be envisioned; in the example of FIG. 5, a robotic arm including a vacuum system is depicted for purposes of illustration.

In the example of FIG. 5, robotic arm 510 includes a nozzle 525 and is configured with three rotational actuators 521, 522 and 523 which may be operated by control unit 520 to position and orient the nozzle 525 to a desired location in three-dimensional space. In some cases, the depowdering system 500 may automatically direct nozzle 525 to locations of the powder bed based on known locations of parts within the powder bed. For instance, in the case of the powder bed being a portion of a build box, the depowdering system may operate the nozzle 525 by executing instructions that control motion of the nozzle and that were generated based on known locations of the parts within the build box.

According to some embodiments, the container 511 may comprise a platform (e.g., a build plate) within the interior of the container on which the mixture of powder and parts 513 is situated. In such cases, vibration may be applied to the platform to produce the aforementioned fluidization of powder. Vibration may be applied to the platform, to the walls of the container, or to both the platform and the walls by respective mechanical vibrators in some embodiments. Where vibration is applied to only the platform or the walls, it will be appreciated that vibration applied to the platform may cause vibration of the walls as a secondary effect, or that vibration applied to the walls may cause vibration of the platform as a secondary effect.

According to some embodiments, alternative means of removing powder that may be arranged in depowdering system 500 in addition to, or alternatively to, the vacuum nozzle 525, may include a source of pressurized gas (e.g., forced air) and/or a blade to push powder out of the container 511.

Figure 6A:
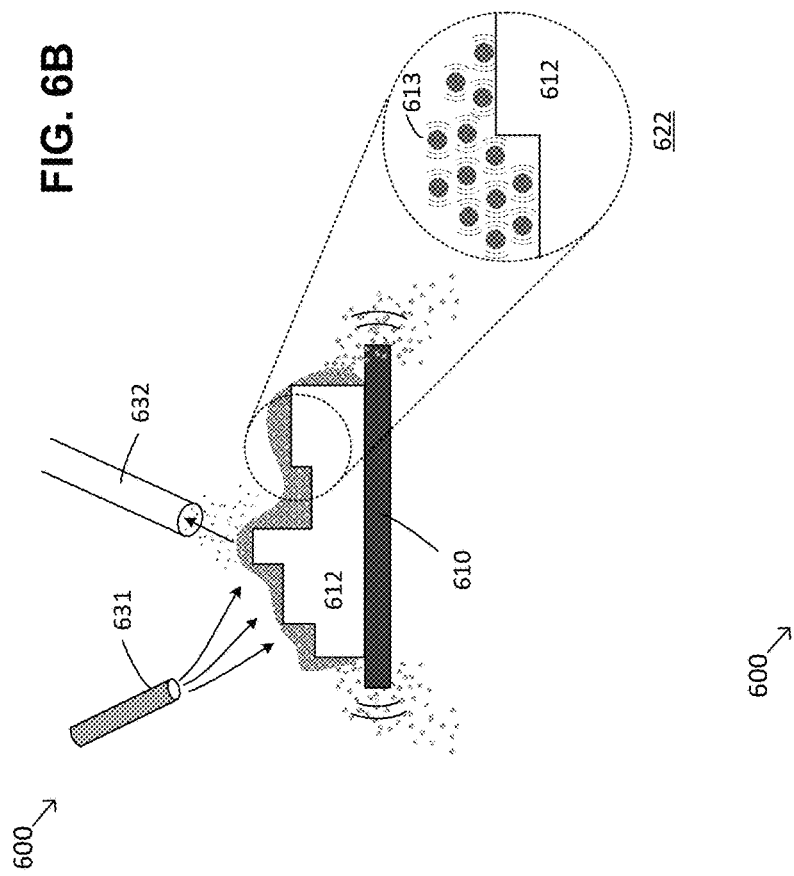
FIGS. 6A-6C depict an illustrative sequence of depowdering in which a part and powder are arranged on a vibrating plate, according to some embodiments.
Figure 6B:
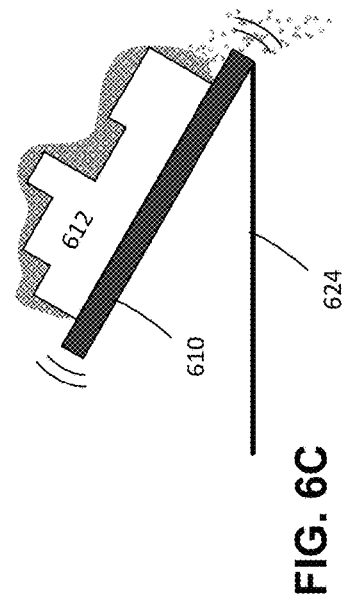
Figure 6C:
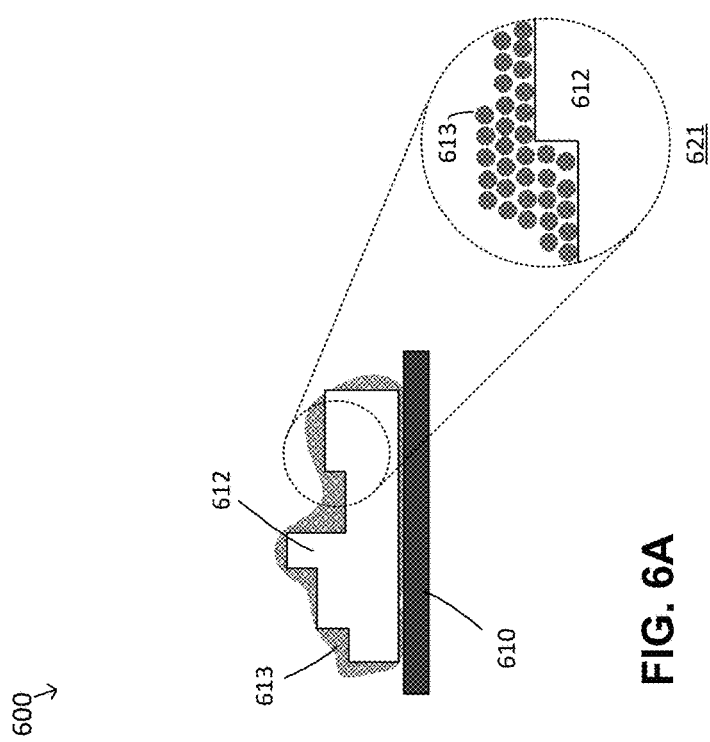

FIGS. 6A-6C depict an illustrative sequence of depowdering in which a part and powder are arranged on a vibrating plate, according to some embodiments. In the example of FIGS. 6A-6C, depowdering system 600 includes a plate 610 on which part 612 is placed. In the example of FIGS. 6A-6C, the part 612 has a coating of loose powder 613 on its surface. In this manner, the depowdering technique illustrated in FIGS. 6A-6C may be considered an example of "fine" depowdering, whereas the techniques of FIG. 5 (for instance) are primarily directed to "coarse" depowdering. Any number of parts may be placed on the plate 610, but a single part is shown in FIGS. 6A-6C for clarity.

In the example of FIG. 6A, the plate 610 is at rest and, as shown by inset 621, particles of the powder 613 are arranged in close proximity to one another while resting on part 612. In FIG. 6B, the plate 610 is vibrated, causing particles of the powder 613 to locally collide with one another and thereby increase the effective spacing between particles, as shown by inset 622. As a result, powder may fall from the sides of the plate 610 due to gravity as illustrated, while the part 612 remains on the plate.

In the example of FIG. 6B, the depowdering system 600 includes a source of pressurized gas 631 and a vacuum 632. The source of pressurized gas 631 may be operated and maneuvered via a suitable coupled motion control system (e.g., a robotic arm, a gantry, etc.) to direct the gas onto a selected portion of the surface of part 612 and thereby remove additional powder from the part over and above that being removed by the vibration of plate 610. The vacuum 632 may be operated and maneuvered via a suitable coupled motion control system (e.g., a robotic arm, a gantry, etc.) to suck powder away from the surface of part 612. Each of the source of pressurized gas 631 and the vacuum 632 may operate more effectively at moving powder during vibration of plate 610 than they would otherwise be in the absence of said vibration.

In the example of FIG. 6C, the platform 610 is tilted during vibration of the platform. As a result, gravity may aid in the powder moving off the platform during the vibration. Either or both of the platform and a suitable structure to which the platform is mounted (e.g., structure 624) and that is actuated to lift a portion of the platform may be vibrated in the example of FIG. 6C.

FIGS. 7A-7C depict cross-sectional views of an illustrative depowdering system comprising a powder fluidizing device, according to some embodiments. In the example of FIGS. 7A-7C, depowdering system 700 includes a fluidizing device 705 configured to be inserted into a powder bed to vibrate and excite particles of powder via techniques to be described below. The depowdering system may operate the fluidizing device with other techniques for removal of powder, including those described herein. For instance, the depowdering system of FIGS. 3A-3C may comprise a fluidizing device to aid in fluidizing select regions of the powder in addition to vibration of the build box described above.

Also in the example of FIGS. 7A-7C, the fluidizing device 705 is motion controlled by an automated gantry (of which a portion 720 is illustrated), thereby providing for automated motion of the fluidizing device along the depicted x-axis 721 and z-axis 722. It will be appreciated that any suitable motion control system may be coupled to one or more fluidizing devices 705 and that the automated gantry of FIGS. 7A-7C is provided merely as an illustrative example.

In the example of FIG. 7A, the fluidizing device 705 is located outside of the powder bed 713, which is held by container 711 (which may or may not be a build box). As shown by inset 731, particles of the powder bed are packed which, as discussed above, can lead to clumping behavior due to interparticle forces such as electrostatic interactions. In FIG. 7B, at least a portion of the fluidizing device 705 is inserted into the powder bed 713 to be proximate to particles of the powder, as shown in inset 732. In the example of FIGS. 7A-7C, no parts are shown in the powder bed 713 for clarity.

In FIG. 7C, the fluidizing device 705 is activated by the depowdering system 700, which causes particles of the powder proximate to at least part of the fluidizing device within the powder to be excited. In particular, vibrations introduced into the powder by the fluidizing device 705 may cause local particles to (elastically) collide with one another. As shown in inset 733, this excitation of the particles can increase their interparticle distance, leading to a reduction in the aforementioned clumping behavior. In some cases, this may cause a local swelling of the powder bed, as shown in FIG. 7C.

According to some embodiments, a depowdering system may comprise multiple fluidizing devices, such as fluidizing device 705, and may be configured to operate and move said devices to act on any desired area of the powder bed held by a container (e.g., a build box or otherwise). In some cases, the depowdering system 700 may automatically direct one or more fluidizing devices to locations of the powder bed based on known locations of parts within the powder bed. For instance, in the case of the powder bed being a portion of a build box, the depowdering system may operate a fluidizing device by executing instructions that control motion of the fluidizing device and that were generated based on known locations of the parts within the build box.

In some embodiments, the depowdering system may be configured to direct the one or more fluidizing devices to different heights within the powder bed at the same time. For instance, fluidizing devices may simultaneously be operated at different positions around a part within the powder bed (e.g., above, below and/or on sides of the part).

According to some embodiments, a fluidizing device may be configured to have a vibrational portion that is longer along one direction than along another direction. Selection of a suitable 'aspect ratio' of the relative sizes of different axes of the vibrational portion may produce more fluidization of the powder in one direction compared with another. For instance, a vibrational portion having the shape of a prolate spheroid may produce more fluidization of the powder in a direction along the long axis of the prolate spheroid compared with fluidization along axes perpendicular thereto.

According to some embodiments, a fluidizing device may comprise one or more mechanical transducers (e.g., vibrational actuators) configured to produce mechanical motion of at least part of the probe when operated by the depowdering system.

According to some embodiments, a depowdering system may be configured to excite a fluidizing device via electromagnetic excitation. For instance, the fluidizing device may comprise one or more electromagnets and one or more permanent magnets may be placed close to the probe (which may be inside or outside of the powder bed). By adjusting the current through the electromagnet, it may be alternately attracted and repulsed by the permanent magnet, leading to a vibration of the electromagnet. As another example, magnetic elements may be inserted into the powder bed and vibrated by oscillating magnetic forces. The magnetic elements may be inserted as a fluidizing device and/or may be present within the powder (e.g., there may be a magnetic component of the powder).

According to some embodiments, any of the illustrative examples of a fluidizing device discussed above may be configured to vibrate at a frequency between 100 Hz and 10 MHz. For example, the fluidizing device may comprise an ultrasonic transducer.

FIG. 8 depicts an illustrative fluidizing device and associated vacuum, according to some embodiments. As discussed above, a depowdering system may operate a fluidizing device along with other techniques for removal of powder. Depowdering system 800 is an example of such a system in which a fluidizing device 810 is operated along with a vacuum device 820. The fluidizing device 810 and vacuum 820 may be operated by the depowdering system 800 separately, or as a unit. For instance, the fluidizing device and vacuum may be coupled to a common movable stage (e.g., a gantry, a portion of a robotic arm, etc.) such that both elements move in concert with one another.

As discussed above, a depowdering system may be configured to move a container so as to produce granular convection of powder and/or parts within the container. Granular convection refers to a phenomenon observed when a container filled with objects of different sizes and/or masses is agitated. In particular, objects may rearrange and organize themselves within the container. For instance, the objects may organize themselves vertically with smaller and/or lighter objects toward the bottom and larger and/or heavier objects toward the top. Objects may move within the container according to convection currents that cause parts and powder to move in respective directions that depend on the geometry of the container. This behavior is illustrated in the example of FIGS. 9A-9E, which depict stages of vibrating a container in a depowdering system 900, according to some embodiments.

In FIG. 9A, a container 911 of depowdering system 900 contains a mixture of powder and parts 913 and is at rest. In FIG. 9B, the depowdering system 900 initiates movement of the container 911, which may include, but need not be limited to, vibrational motion. Examples of suitable motions to induce granular convection are discussed further below. Due to the movement of the container 911, granular convection currents may be produced within the mixture of powder and parts, as illustrated by the arrows shown in FIG. 9C. These currents may gradually cause the parts of the mixture 913 to rise to the top of the mixture, as shown in FIG. 9D.

Once parts have reached the top of the mixture, which may mean that parts are exposed above the surface of the mixture, the parts 914 can be removed from the container via a suitable means, which may include manual and/or automated removal (e.g., using a robotics system). The container 911 may represent a build box or may be a container into which the mixture of powder and parts has been transferred (e.g., via any of the techniques discussed above in relation to FIGS. 2A-2E).

The shape of the container 911 in the example of FIGS. 9A-9E may affect the shape and magnitude of the convection currents established when the container is moved. In particular, parts may agglomerate in certain regions of the container that depend on the container's geometry.

FIGS. 10A-10D depict four different containers and directions of convection currents that may be produced by operating an associated depowdering system to move the container, according to some embodiments. In each of the examples of FIGS. 10A-10D, it will be appreciated that the direction of convection currents are illustrative and not limiting, since a manner in which the container is vibrated or otherwise moved may affect the direction and positions of such currents in practice.

Figure 10A:
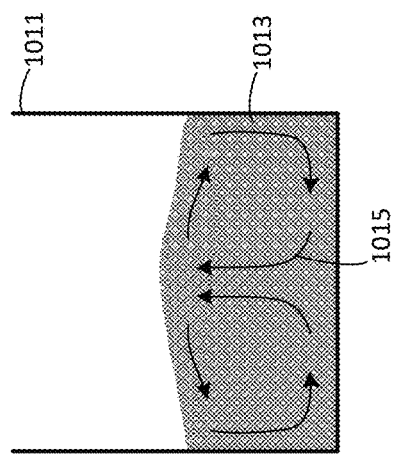
FIGS. 10A-10D depict illustrative containers and respective directions of granular convection currents that may be produced by moving the container, according to some embodiments.

The example of FIG. 10A depicts a rectangular container 1011 comprising a mixture of powder and parts 1013. The arrows 1015 depict illustrative convection currents that may be produced through suitable vibration or other movement of the container 1011.

Figure 10B:
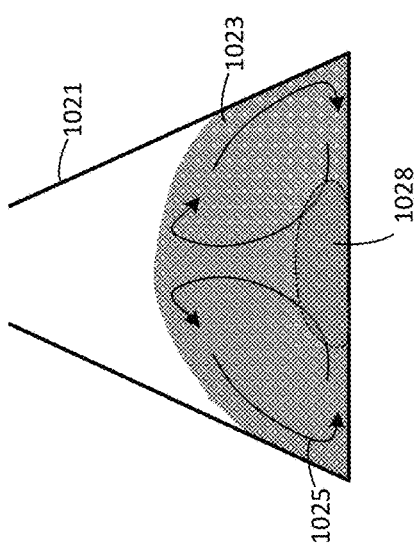

The example of FIG. 10B depicts a container 1021 with acute angled walls comprising a mixture of powder and parts 1023. The arrows 1025 depict illustrative convection currents that may be produced through suitable vibration or other movement of the container 1021. In addition, a region 1028 in which parts may agglomerate as a result of the convection currents 1025 is identified.

Figure 10C:
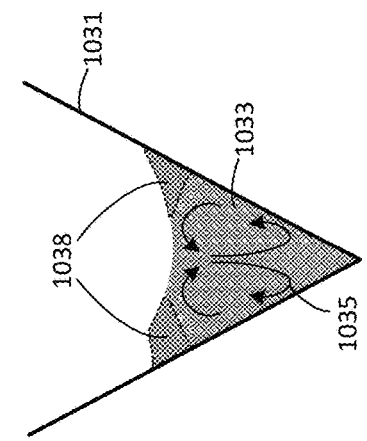

The example of FIG. 10C depicts a "v-shaped" container 1031 comprising a mixture of powder and parts 1033. The arrows 1035 depict illustrative convection currents that may be produced through suitable vibration or other movement of the container 1031. In addition, regions 1038 in which parts may agglomerate as a result of the convection currents 1035 are identified.

Figure 10D:
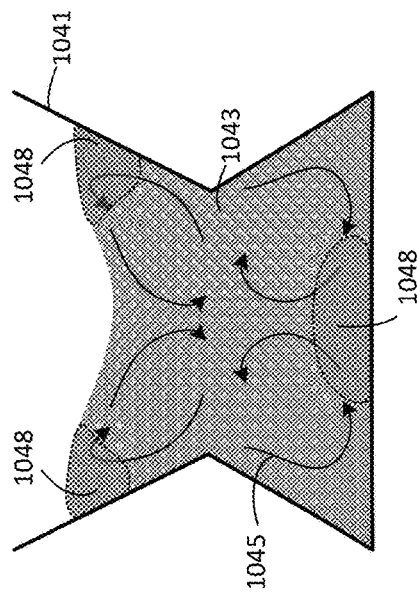

The example of FIG. 10D depicts a container 1041 comprising a mixture of powder and parts 1043. The arrows 1045 depict illustrative convection currents that may be produced through suitable vibration or other movement of the container 1041. In addition, regions 1048 in which parts may agglomerate as a result of the convection currents 1045 are identified.

FIGS. 11A-11F depict various strategies for vibrating or otherwise moving a container so as to produce granular convection behavior of parts within, according to some embodiments. In each of FIGS. 11A-1F, a container 1111 of a depowdering system 1100 is shown. The container 1111 comprises a mixture of powder and parts 1113 and the depowdering system 1100 is configured to move the container in the manner illustrated and described below. It will be appreciated that depowdering system 1100 may be configured to move the container 1111 in any one or more of the different ways illustrated in FIGS. 11A-11F and described below. In some cases, the depowdering system 1100 may be configured to move the container 1111 in only one of these ways, for instance, whereas in some cases the depowdering system may be configured to move the container 1111 in more than one of these ways, which may include simultaneous and/or sequential application of the different types of movement.

Figure 11A:
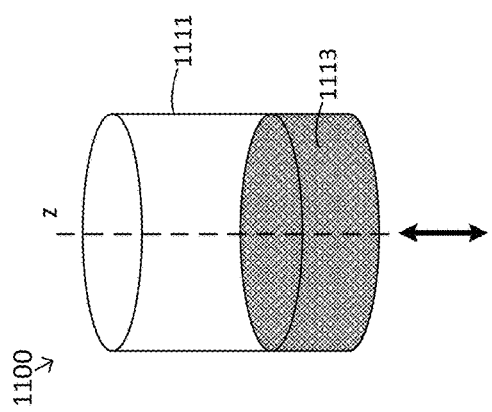
FIGS. 11A-11F depict various strategies for moving a container so as to produce granular convection of parts within, according to some embodiments.
Figure 11B:
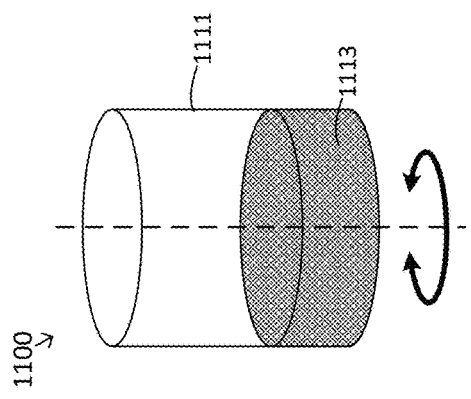
Figure 11C:
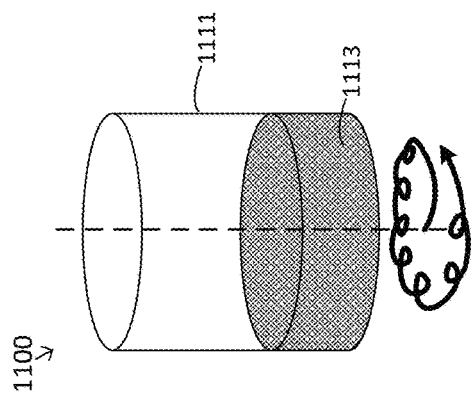

FIG. 11A depicts an example of moving (e.g., vibrating) the container 1111 in a linear direction along a z-axis (e.g., a vertical axis being parallel to the long axis of the container). FIG. 11B depicts an example of moving (e.g., vibrating) the container 1111 in a rotational direction about the z-axis. FIG. 11C depicts an example of moving (e.g., vibrating) the container 1111 in an orbital motion around the z-axis. An orbital motion may, for instance, comprise rotating the container 1111 while moving the container in an elliptical path about the same axis.

Figure 11D:
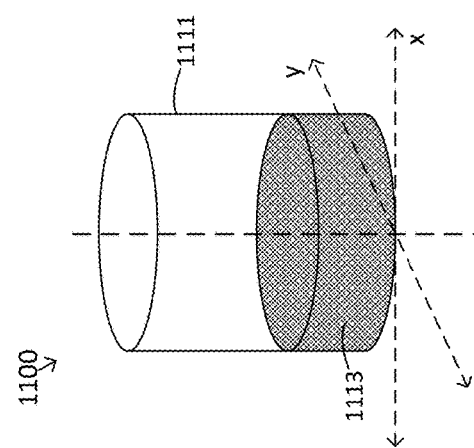
Figure 11E:
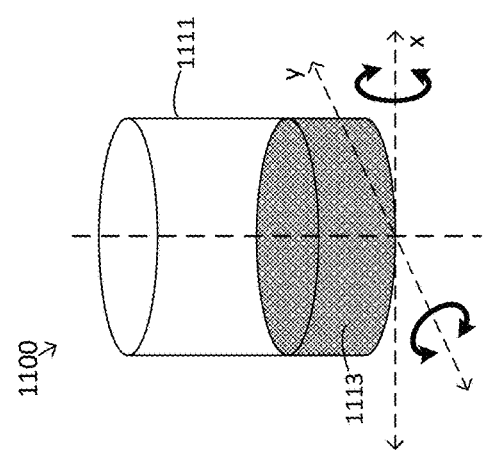
Figure 11F:
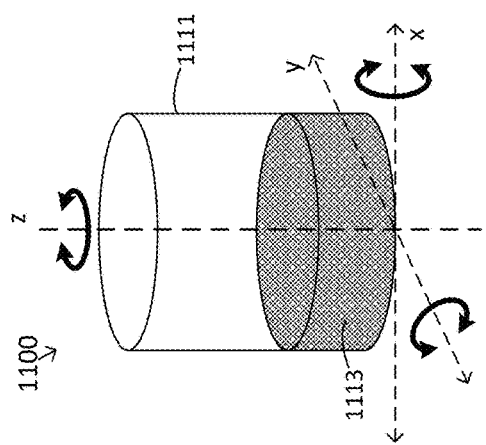

FIG. 11D depicts an example of moving (e.g., vibrating) the container 1111 within a linear x-y plane. Said movement may comprise any motion along the plane, which may for instance be perpendicular to the long axis of the container. For example, the motion may comprise a repeated path in two-dimensions, which may be a circular or elliptical path, but could also be a random or pseudo-random path. FIG. 11E depicts an example of moving (e.g., vibrating) the container 1111 around both x- and y-axes simultaneously. Such motion may in effect move the central axis of the container along a conical path, for instance. The speed of the motion need not be the same along the two axes. FIG. 11F depicts an example of moving (e.g., vibrating) the container 1111 around x, y and z-axes simultaneously.

Figure 12:
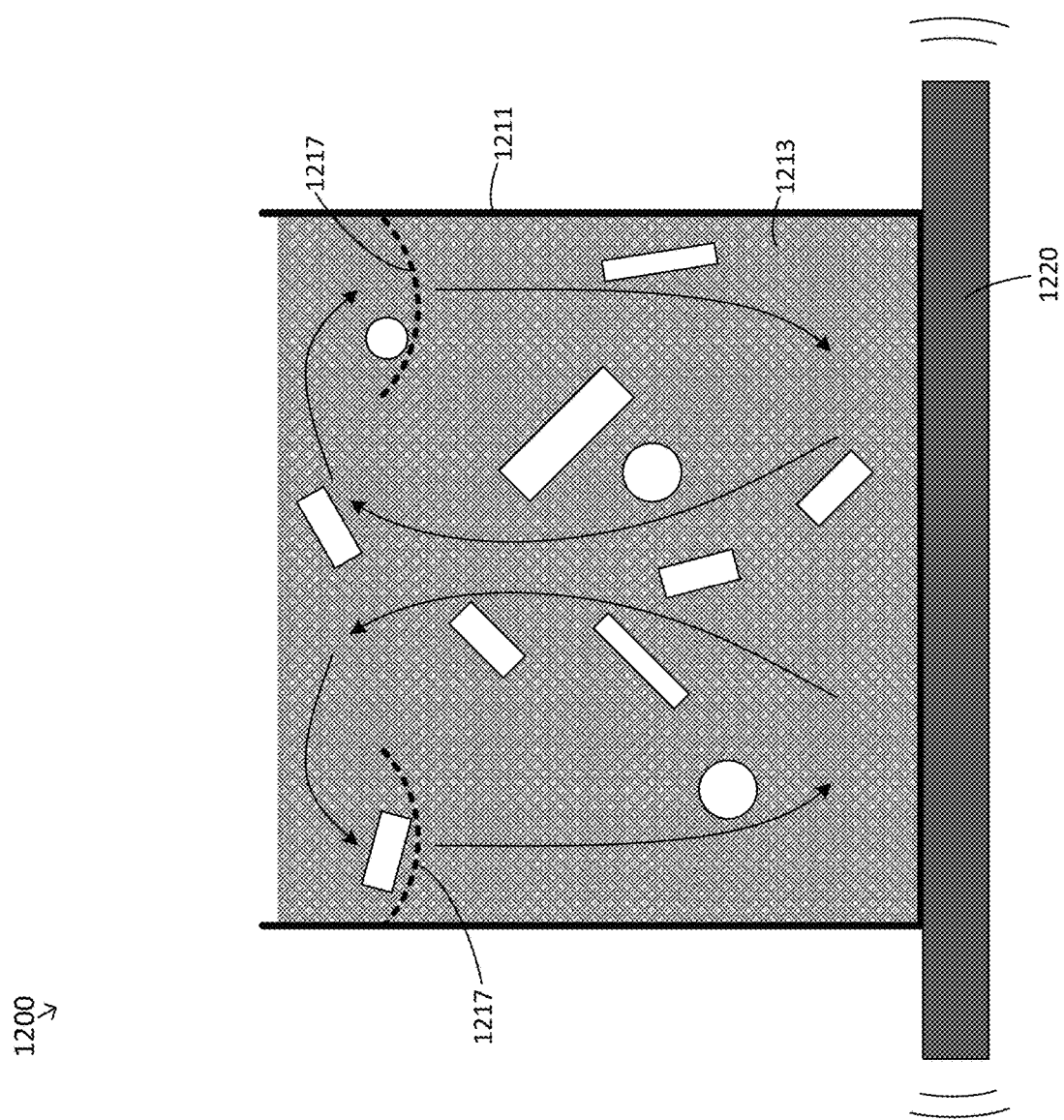
FIG. 12 depicts an illustrative container comprising baskets for collecting parts through granular convection, according to some embodiments.

FIG. 12 depicts an illustrative container comprising baskets for collecting parts through granular convection, according to some embodiments. Depowdering system 1200 shown in FIG. 12 comprises container 1211 that holds a mixture of powder and particles 1213. The container also includes baskets 1217, which include a plurality of perforations or other openings that are sized so that powder can pass through them but parts generally cannot. The baskets may, for instance, comprise a sifter such as a metal sieve. In the example of FIG. 12, granular convection is produced by operating the depowdering system to vibrate a vibration table 1220.

In the example of FIG. 12, convection currents having directions represented by the arrows may be created within the container, causing parts and powder to circulate upward through the middle of the container and onto the baskets. Powder may pass through the baskets and continue back down to the bottom of the container as shown, while parts may become captured by the baskets. As a result, the parts may be retrieved from the baskets subsequent to their capture by the baskets. Parts "captured" by the baskets may for instance be held by the baskets, but may also move such that their motion retains the parts within a region proximate to a basket.

Figure 13A:
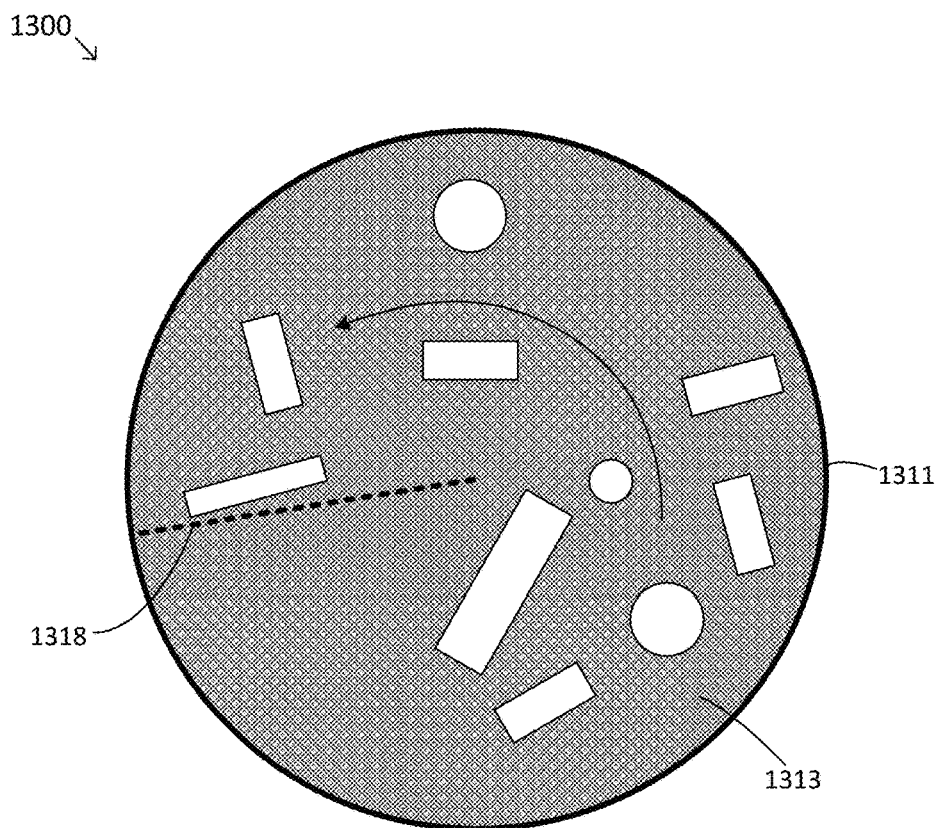
FIGS. 13A and 13B depict top and side views, respectively, of an illustrative container comprising a perforated screen for collecting parts through granular convection, according to some embodiments.
Figure 13B:
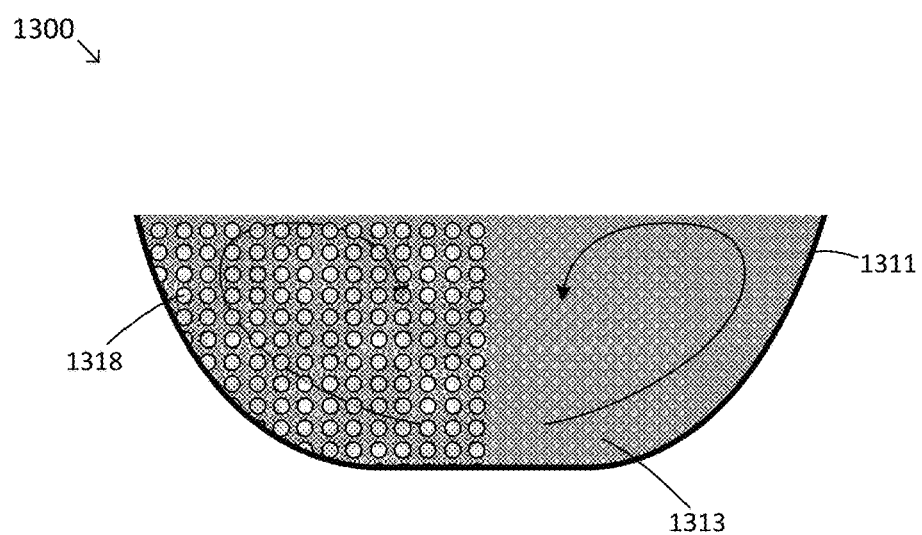

FIGS. 13A and 13B depict top and side views, respectively, of an illustrative container comprising a perforated screen for collecting parts through granular convection, according to some embodiments. In the example of FIGS. 13A-13B, depowdering system 1300 includes a container 1311 and is configured to vibrate the container to produce granular convection there. In some embodiments, the depowdering system 1300 may be configured to vibrate the container 1311 in an orbital vibration pattern, for instance, as shown in FIG. 11C.

In the example of FIGS. 13A-13B, container 1311 comprises a perforated screen 1318, which may block parts while allowing powder to pass therethrough. Granular convection currents produced by the depowdering system vibrating the container may circulate the powder and parts around the container (as shown by the arrows in FIG. 13A) while also circulating the powder and parts from bottom to top of the container (as shown by the arrows in FIG. 13B).

Figures 14A, 14B:
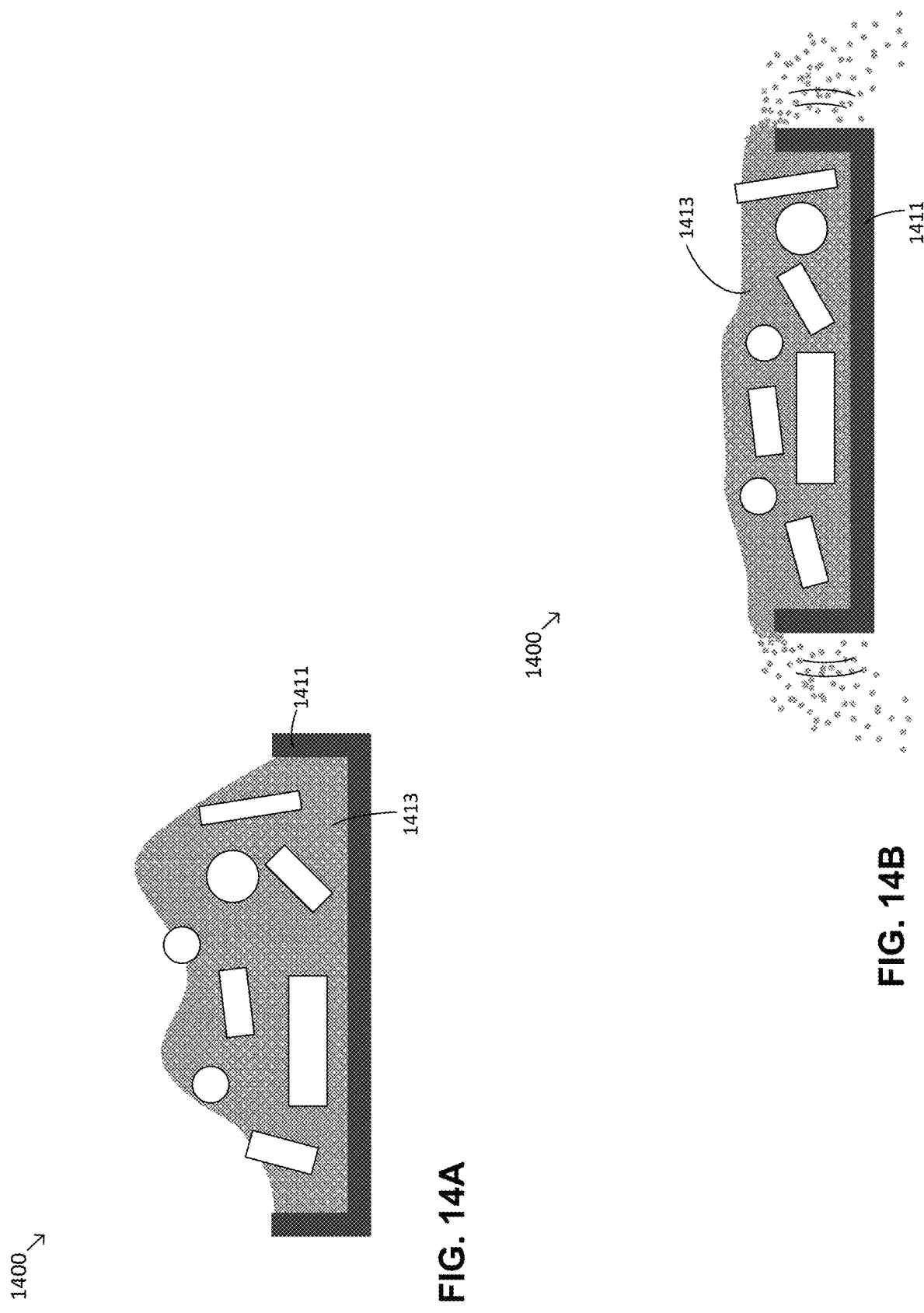
FIGS. 14A-14B illustrate cross-sectional views of a powder bed that extends above the top of a container, according to some embodiments.

FIGS. 14A-14B illustrate cross-sectional views of a powder bed that extends above the top of a container, according to some embodiments. In the example of FIGS. 14A-14B, depowdering system 1400 includes a container 1411 that holds a mixture of powder and parts 1413. As shown in FIG. 14A, the mixture 1413 is piled into the container such that it extends above the top of the walls of the container. Such a mixture may remain static in such an arrangement due to the low flowability of the powder, as discussed above.

The depowdering system may be operated to vibrate the container 1411, which as shown in FIG. 14B may cause powder to flow downwards under gravity such that some powder escapes over the walls of the container. The parts within the mixture 1413 may remain in the container, however, if the vibration is insufficiently strong to cause the parts to vibrate over the sides of the container. Moreover, powder below the top of the walls of the container may remain in the container, thereby providing a cushion that may protect the parts from damage (e.g., damage as a result of knocking into the container during vibration of the container). The result of vibration of the container by the depowdering system may, therefore be that the container holds the parts along with some powder that lies substantially below the walls of the container. The parts can then be removed via suitable manual and/or automatic means.

According to some embodiments, it may be beneficial for the interior bottom surface of the container 1411 to be solid, since while openings in that surface may aid in removal of powder, this may also risk damage to the parts when they hit the container surface in the absence of the aforementioned cushion.

According to some embodiments, the container 1411 may be vibrated by the depowdering system 1400 in a manner so as to produce granular convection. For instance, any one or more of the motion schemes discussed above in relation to FIGS. 11A-11F may be applied when vibrating the container 1411.

Figure 15A:
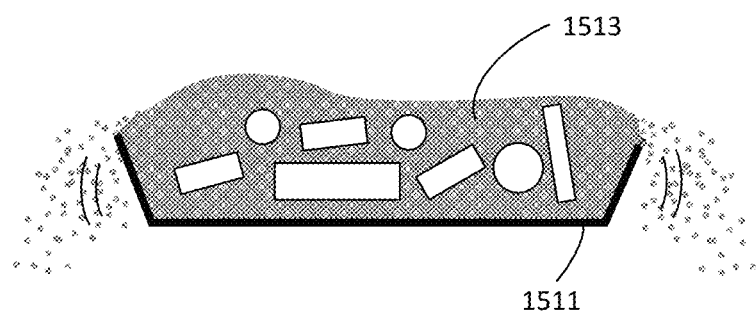
FIGS. 15A-15C depict alternative arrangements for a container that may be arranged within the depowdering system of FIGS. 14A-14B, according to some embodiments.
Figure 15B:
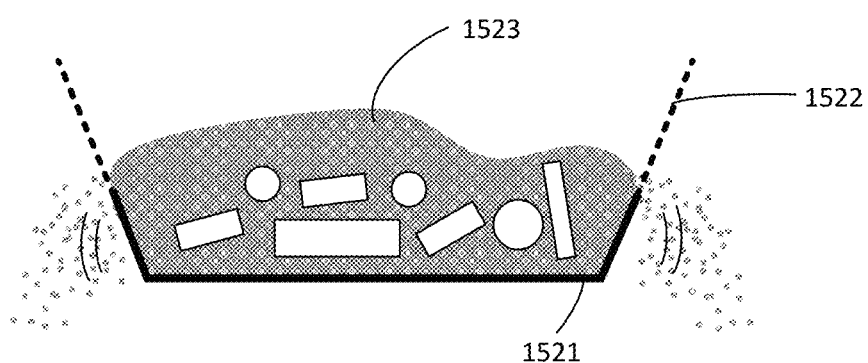
Figure 15C:
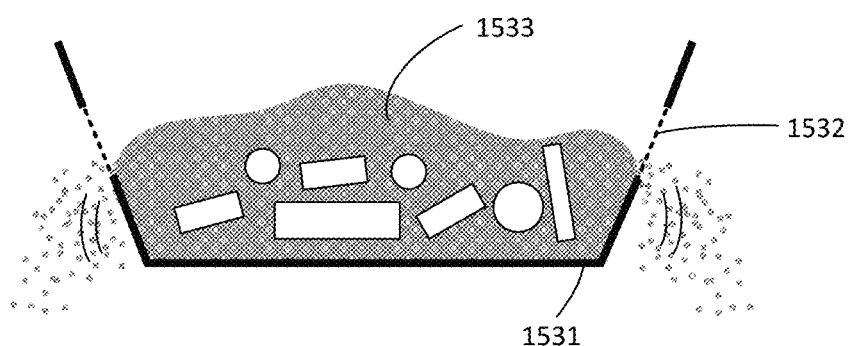

FIGS. 15A-15C depict alternative arrangements for a container that may be arranged within a depowdering system as shown in FIGS. 14A-14B, according to some embodiments. In particular, each of the illustrative containers 1511, 1521 and 1531 shown in FIGS. 15A, 15B and 15C, respectively, may be substituted for container 1411 and vibrated by the depowdering system to remove powder as described above.

In the example of FIG. 15A, container 1511 holds a mixture of powder and parts 1513 and undergoes vibration, causing powder from the mixture to spill over the sides of the container. Container 1511 has sides that are at an obtuse angle with respect to the base of the container. The orientation of the side walls may affect how readily removal of powder can be initiated during vibration of the container and/or the speed at which the powder is removed during vibration.

In the example of FIG. 15B, container 1521 holds a mixture of powder and parts 1523 and undergoes vibration, causing powder from the mixture to spill over the sides of the container. Container 1521 includes a number of perforations, apertures or other openings 1522 in the side walls of the container. The openings 1522 may allow powder to pass through while retaining parts within the container. This configuration may ensure that parts are held within the container during vibration and do not accidentally fall over the side walls of the container as a result of the vibration, because the side walls can be made to be high enough to retain the parts while not affecting how readily the powder can be removed.

In the example of FIG. 15C, container 1531 holds a mixture of powder and parts 1533 and undergoes vibration, causing powder from the mixture to spill over the sides of the container. As with the example of FIG. 15B, container 1531 includes a number of perforations, apertures or other openings 1532 in the side walls of the container. In contrast to FIG. 15B, however, the container 1531 shown in FIG. 15C include openings in one section of the side walls. The openings 1531 may for instance include a plurality of holes.

Figure 16B:
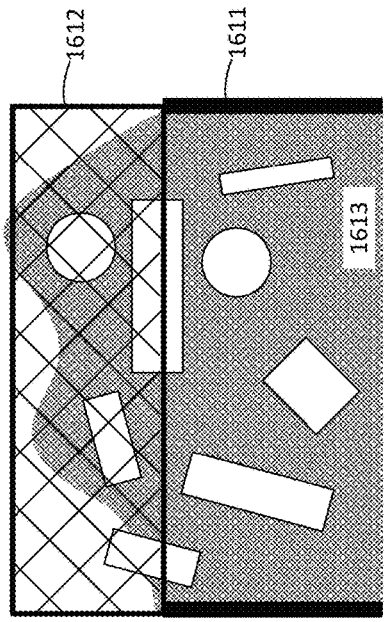
FIGS. 16A-16C depict cross-sectional views of an illustrative container comprising a structure including openings in its walls, according to some embodiments.
Figure 16C:
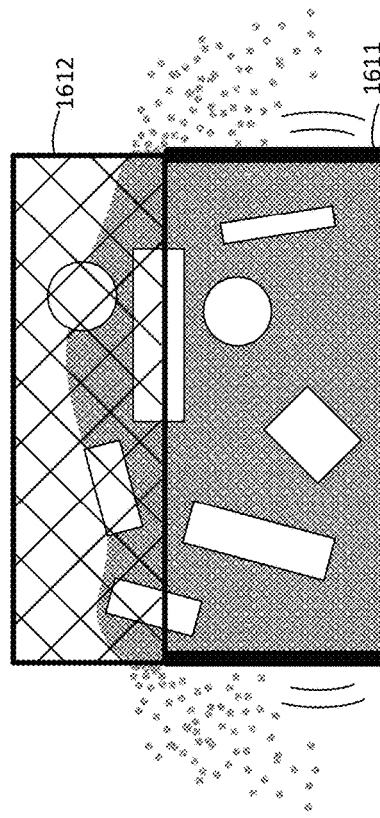
Figure 16A:
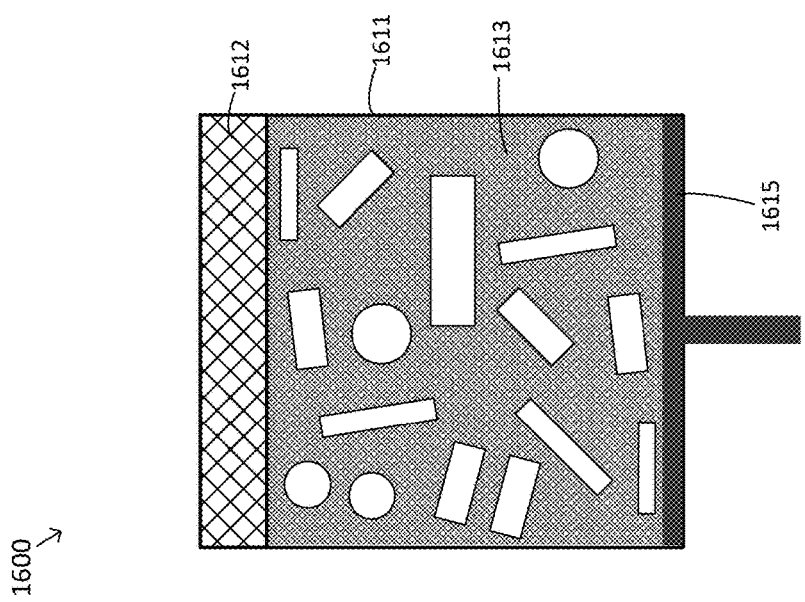

FIGS. 16A-16C depict cross-sectional views of an illustrative container comprising a structure including openings in its walls, according to some embodiments. In the example of FIG. 16A, depowdering system 1600 comprises container 1611, which includes a mixture of powder and parts 1613. Container 1611 comprises a structure 1612 that including openings which form the uppermost sections of at least some of the walls of the container. The openings may be large enough to allow powder from within the container to pass through the openings while inhibiting parts from passing through. In the example of FIG. 16A, the structure 1612 is formed from a grill or sieve structure. In some embodiments, container 1611 may be a build box.

FIG. 16B illustrates a view of the uppermost section of the container 1611 subsequent to the arrangement shown in FIG. 16A after the mixture 1613 has been pushed upwards within the container (e.g., via delivery mechanism 1615). Powder within the mixture 1613 that has been pushed above any of the openings of the structure 1612 could conceivably pass through said openings, however the bulk of the powder may remain static in such an arrangement due to the low flowability of the powder, as discussed above.

In the example of FIG. 16C, the depowdering system 1600 vibrates the container 1611, which may cause powder of the mixture 1613 to flow though the openings in structure 1612. In some embodiments, the mixture of powder and parts may be pushed upward (e.g., continuously during vibration of the container, alternately with vibration of the container, etc.), with vibration of the container removing powder from the mixture. At the end of such a process, the parts may rest (along with a comparatively small amount of powder) on the platform of delivery mechanism 1615, with the platform having been raised to the approximate height of the structure 1612. The parts can then be removed from the container via suitable manual and/or automatic means.

Figure 17:
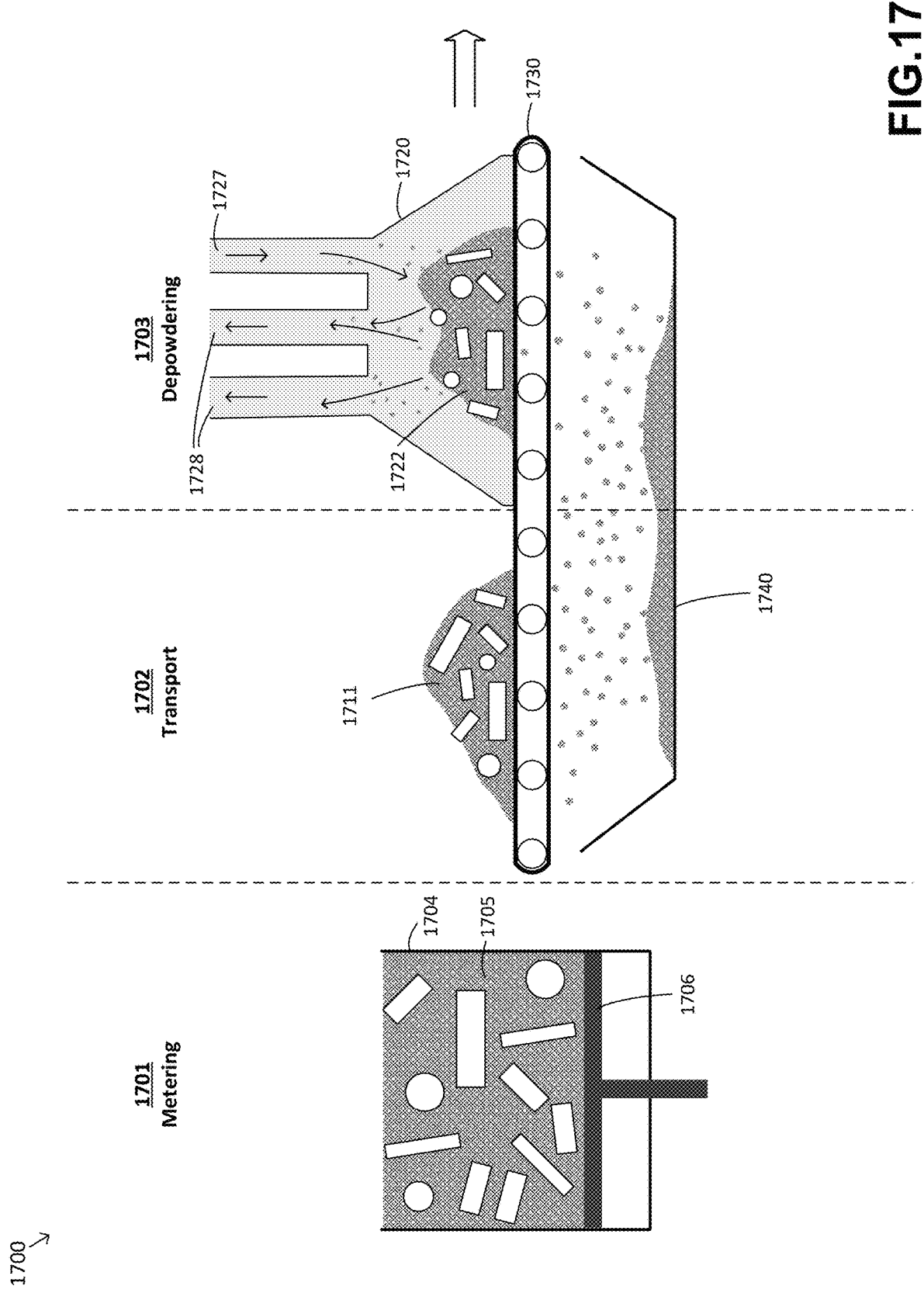
FIG. 17 depicts a multi-stage depowdering system, according to some embodiments.

FIG. 17 depicts a multi-stage depowdering system, according to some embodiments. As discussed above in relation to FIG. 1, a system for additive fabrication may automate motion of a powder bed within a depowdering system and/or may automate motion of a powder bed between an additive fabrication device and the depowdering system. FIG. 17 depicts depowdering system 1700 which includes several stages in which and/or parts are metered from a build box onto a conveyor belt and depowdered.

In the example of FIG. 17, in a first stage 1701 some or all of the contents 1705 of build box 1704 may be metered onto conveyor belt 1730. Said metering may include, although is not limited to, any of the metering techniques discussed above in relation to FIGS. 2A-2E.

In a second stage 1702 shown in FIG. 17, parts and powder metered from the build box 1704 are transported along the conveyor belt 1730. In some embodiments, the conveyor belt may be configured to remove powder from the conveyor belt as the parts are transported. In some cases, the belt may include openings or perforations such that powder may fall through gaps within the belt into the powder collection bin 1740.

According to some embodiments, conveyor belt 1730 may be coupled to a source of vibration, such as one or more actuators, and vibrated during operation of the depowdering system 1700. Vibration of the belt may thereby cause powder to flow off the sides of the belt. In some cases, where the belt includes openings or perforations, powder may additionally or alternatively fall through said openings or perforations.

In a third stage 1703 shown in FIG. 17, a hood 1720 may be placed over the conveyor belt 1730 and air (or another gas) passed through the hood at high speed to dislodge and/or remove powder from the parts. The hood 1720 may for instance be coupled to a source of pressurized air via intake port 1727 and coupled to a comparatively lower pressure via output ports 1728. Hood 1720 may be coupled to one or more linear actuators, which may be operated by the depowdering system to raise and lower the hood onto and off of the conveyor belt 1730. For instance, the hood may be coupled to a lead screw which may be rotated by a coupled motor to raise and lower the hood.

According to some embodiments, in operation depowdering system 1700 may meter a portion of the build box 1704 onto the conveyor belt 1730 to produce a first mixture of powder and parts 1711 on the conveyor belt. The depowdering system may transport mixture 1711 along the conveyor belt, and may optionally vibrate the belts during said transport as discussed above. When a mixture of powder and parts has been transported beneath hood 1720 (when in a position raised above the conveyor belt), the hood may be lowered onto the mixture 1722 and motion of the conveyor belt may be stopped during depowdering by the hood 1720.

Subsequently, the depowdering system 1700 may be operated to produce a pressure differential between the intake and output ports 1727 and 1728 and thereby cause air (or another gas) to pass through the hood's interior volume at high speed and disrupt powder from the mixture 1722. For instance, the depowdering system 1700 may open or close one or more valves coupled to pressurized sources of gas and/or low pressure sources (e.g., vacuum pumps). In some embodiments, the conveyor belt may be vibrated by the depowdering system 1700 while the hood is operated to depowdering the mixture 1722 via directed application of the gas. As such, additional powder may fall into the powder collection bin 1740 in addition to any powder that may be removed through the output ports 1728.

Subsequently, the hood 1720 may be raised from the conveyor belt and parts that remain on the conveyor belt transported to an additional stage, which may for instance perform further depowdering operations. In some embodiments, the parts may be transported by the depowdering system to a device configured to perform fine depowdering.

Figure 18B:
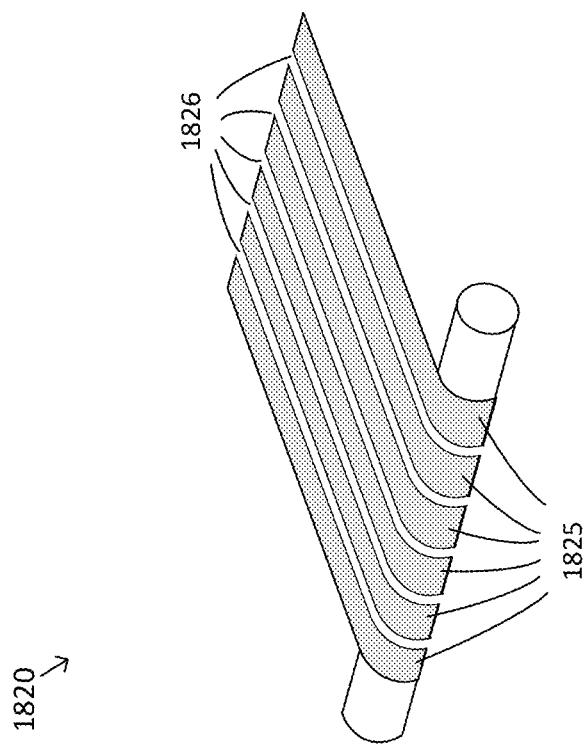
FIGS. 18A and 18B depict examples of conveyor belts comprising perforations or openings therein, according to some embodiments.
Figure 18A:
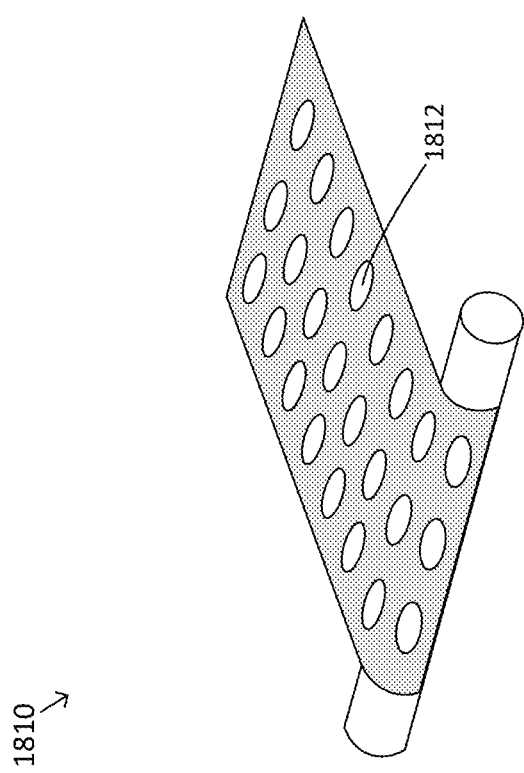

FIGS. 18A and 18B depict examples of conveyor belts that include openings or perforations such that powder may fall through gaps within the belt as discussed above in relation to FIG. 17.

Conveyor belt 1810 shown in the example of FIG. 18A includes a plurality of perforations 1812 though which powder may fall during transportation of powder and parts on the belt. Powder may be removed during said transportation irrespective of whether or not the belt is coupled to a source of vibration, such as an actuator, although vibration of the belts using such an actuator may increase the amount of powder removed through the perforations.

Conveyor belt 1820 shown in the example of FIG. 18B comprises multiple belt sections 1825 with gaps 1826 between adjacent belt sections. As such, powder may fall between the belt sections during transportation of powder and parts on the belt. Powder may be removed during said transportation irrespective of whether or not the belt is coupled to a source of vibration, such as an actuator, although vibration of the belts using such an actuator may increase the amount of powder removed through the gaps.

An illustrative implementation of a computer system 1900 that may be used to perform any of the techniques described above is shown in FIG. 19. The computer system 1900 may include one or more processors 1910 and one or more non-transitory computer-readable storage media (e.g., memory 1920 and one or more non-volatile storage media 1930). The processor 1910 may control writing data to and reading data from the memory 1920 and the non-volatile storage device 1930 in any suitable manner, as the aspects of the invention described herein are not limited in this respect. To perform functionality and/or techniques described herein, the processor 1910 may execute one or more instructions stored in one or more computer-readable storage media (e.g., the memory 1920, storage media, etc.), which may serve as non-transitory computer-readable storage media storing instructions for execution by the processor 1910.

In connection with techniques described herein, code used to, for example, generate instructions that, when executed, cause an additive fabrication device to fabricate one or more parts, cause a depowdering system to automatically perform depowdering operations (e.g., metering a powder bed, activating/deactivating a vibration source, etc.) may be stored on one or more computer-readable storage media of computer system 1900. Processor 1910 may execute any such code to perform any of the above-described techniques as described herein. Any other software, programs or instructions described herein may also be stored and executed by computer system 1900. It will be appreciated that computer code may be applied to any aspects of methods and techniques described herein. For example, computer code may be applied to interact with an operating system to transmit instructions to an additive fabrication device or depowdering system through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

The above-described techniques may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within 20% of one another in some embodiments, within 10% of one another in some embodiments, within 5% of one another in some embodiments, and yet within 2% of one another in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
fabricating, within a build box inserted into an additive fabrication device, one or more additively fabricated parts from a powder by directing at least one binding agent onto regions of successive layers of the powder;
removing the build box from the additive fabrication device, the build box containing a powder bed comprising the powder and the one or more additively fabricated parts;
inserting the build box into a cavity of a depowdering device;
mechanically coupling the build box to a mechanical vibrator of the depowdering device; and
operating the mechanical vibrator to vibrate the build box, causing at least some of the powder to escape the build box through one or more openings in one or more sidewalls of the build box.

2. The method of claim 1, wherein the powder is a metal powder and wherein the one or more additively fabricated parts comprise particles of the metal powder and at least one binding agent.

3. The method of claim 1, wherein the mechanical vibrator is mechanically coupled to a plate and mechanically coupling the build box to the mechanical vibrator comprises arranging the build box on the plate.

4. The method of claim 1, wherein the one or more openings include a first opening having a movable barrier, and wherein the method further comprises operating the movable barrier from a closed position to an open position.

5. The method of claim 1, wherein the build box includes a build plate on which the powder bed is arranged, wherein the build plate is initially arranged above the one or more openings, and wherein the method further comprises lowering the build plate to bring portions of the powder bed adjacent to at least some of the one or more openings.

6. The method of claim 1, further comprising tilting the build box simultaneously with operating the mechanical vibrator to vibrate the build box.

7. An additive fabrication system comprising:
an additive fabrication device configured to fabricate one or more parts from a powder by directing at least one binding agent onto regions of successive layers of the powder, thereby producing a powder bed comprising the powder and the one or more parts;
a build box comprising one or more openings in one or more sidewalls of the build box, the build box configured to be removably inserted into the additive fabrication device and configured to hold the powder bed; and
a depowdering device comprising:
a cavity configured to removably receive the build box; and
at least one mechanical vibrator configured to mechanically couple to the build box when the build box is installed within the cavity.

8. The additive fabrication system of claim 7, wherein the depowdering device further comprises at least one hopper arranged beneath the at least one mechanical vibrator for catching powder escaping from the build box through the one or more openings.

9. The additive fabrication system of claim 7, wherein the build box comprises a build platform on which the powder bed may be formed, and wherein the depowdering device includes at least one actuator configured to couple to the build platform of the build box and to raise and lower the build platform within the build box.

10. The additive fabrication system of claim 7, wherein the depowdering device further comprises at least one controller configured to detect when the build box is installed within the cavity and to operate the at least one mechanical vibrator when it is detected that the build box is installed within the cavity.

11. The additive fabrication system of claim 7, wherein the one or more openings include one or more slots.

12. The additive fabrication system of claim 7, wherein the one or more openings include a first opening having a movable barrier, and wherein the build box comprises at least one actuator configured to operate the movable barrier between open and closed positions.

13. The additive fabrication system of claim 7, wherein the depowdering device further includes at least one actuator configured to tilt the build box.

14. The additive fabrication system of claim 7, wherein the one or more openings include a first opening having a movable barrier, and the depowdering device further includes at least one actuator to operate the movable barrier from a closed position to an open position.

15. The additive fabrication system of claim 7, wherein the build box includes a build plate on which the powder bed is arranged, wherein the build plate is initially arranged above the one or more openings, and the depowdering device further includes at least one actuator to lower the build plate to bring portions of the powder bed adjacent to at least some of the one or more openings.

16. The additive fabrication system of claim 7, wherein the depowdering device further includes at least one actuator to tilt the build box concurrently with operation of the mechanical vibrator to vibrate the build box.

* * * * *